(12) United States Patent
Durvasula et al.

(10) Patent No.: US 11,720,846 B2
(45) Date of Patent: Aug. 8, 2023

(54) ARTIFICIAL INTELLIGENCE-BASED USE CASE MODEL RECOMMENDATION METHODS AND SYSTEMS

(71) Applicant: MCKINSEY & COMPANY, INC., New York, NY (US)

(72) Inventors: Sastry Vsm Durvasula, Phoenix, AZ (US); Rares Almasan, Phoenix, AZ (US); Neema Uthappa, Phoenix, AZ (US); Sriram Venkatesan, Princeton Junction, NJ (US); Sayan Chowdhury, Nagpur (IN)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/711,880

(22) Filed: Apr. 1, 2022

(65) Prior Publication Data

US 2023/0177441 A1 Jun. 8, 2023

(30) Foreign Application Priority Data

Dec. 7, 2021 (IN) .............................. 202121056829

(51) Int. Cl.
*G06N 5/022* (2023.01)
*G06Q 10/0639* (2023.01)
*G06Q 10/067* (2023.01)
*G06Q 10/0637* (2023.01)

(52) U.S. Cl.
CPC ....... *G06Q 10/06393* (2013.01); *G06N 5/022* (2013.01); *G06Q 10/067* (2013.01); *G06Q 10/06375* (2013.01)

(58) Field of Classification Search
None
See application file for complete search history.

(56) References Cited

U.S. PATENT DOCUMENTS

2019/0057095 A1* 2/2019 Chakravarti ........... G06N 5/022
2019/0354809 A1* 11/2019 Ralhan ................... G06Q 90/00

OTHER PUBLICATIONS

Chen, Lei. Deep Learning and Practice with MindSpore. Springer Nature, 2021. (Year: 2021).*

* cited by examiner

*Primary Examiner* — Daniel T Pellett
(74) *Attorney, Agent, or Firm* — Marshall, Gerstein & Borun LLP; Randall G. Rueth

(57) ABSTRACT

A method includes receiving a plurality of user use cases; analyzing the use cases using an AI engine to order the use cases; generating an optimized machine learning model; and causing an optimized deployment option to be displayed. A computing system includes a processor; and a memory comprising instructions, that when executed, cause the computing system to: receive a plurality of user use cases; analyze the use cases using an AI engine to order the use cases; generate an optimized machine learning model; and cause an optimized deployment option to be displayed. A non-transitory computer-readable storage medium stores executable instructions that, when executed by a processor, cause a computer to: receive a plurality of user use cases; analyze the use cases using an AI engine to order the use cases; generate an optimized machine learning model; and cause an optimized deployment option to be displayed.

20 Claims, 12 Drawing Sheets

ARTIFICIAL INTELLIGENCE-BASED USE CASE MODEL RECOMMENDATION METHODS AND SYSTEMS

CROSS-REFERENCE TO RELATED APPLICATIONS

The present application claims priority to Indian Patent Application No. 202121056829, filed on Dec. 7, 2021, the entire disclosure of which is hereby incorporated by reference.

FIELD OF THE DISCLOSURE

The present disclosure is generally directed to techniques for performing artificial intelligence-based model recommendation, and more particularly, for analyzing information generated via user experiments using artificial intelligence and machine learning, for use cases corresponding to internal user use cases, crowdsourced user use cases and/or discovered use cases.

BACKGROUND

Management consulting companies face several problems in servicing clients in today's ever-accelerating technology environment. Clients expect consultancies to provide timely and accurate recommendations regarding combinations of services that are optimized for the clients' particular use cases and include best-in-class technologies. For example, a managed services consultant may be working with a client innovating in financial technology (i.e., fintech) or insurance technology (i.e., insetch) markets. The client may task the consultancy with providing technology recommendations specific to these industries.

Conventionally, consultancies evaluate technology from first principles for each project, on an ad-hoc basis, which requires large investments of time and human capital to conduct experiments in various environments. These manual experiments involve significant sources of bias, such as a tool or software stack that is favored by a developer, regardless of whether the tool actually represents a best-in-class solution. These manual experiments do not produce generalizable results, include scant optimization and cannot be re-used from one consultancy project to the next without significant engineering, even if there is significant overlap in the technical requirements between consultancy projects.

Further, consultancy users of different backgrounds (e.g., technical and non-technical users) may struggle to reconcile assumptions and information from project to project. And, although assumptions from one project do not necessarily carry over from project to project, and such assumptions are not always re-examined at the beginning of each new consulting project, leading to recommendations that are less than optimal. These manual experiments are also limited to the knowledge and awareness of the employees or agents of the consultancy regarding open source software and software engineering in general, and do not necessarily include a complete picture of all available tools. Thus, recommendations delivered to the client are often far from the best.

Therefore, improved techniques for curating and optimizing use case-based technology experimentation using an intelligent experimentation platform for use in management consulting are needed.

BRIEF SUMMARY

In one aspect, a computer-implemented method for receiving and processing use case information includes (1) receiving, via an electronic network, a plurality of user use case experiments; (2) analyzing, via one or more processors, the use case experiments using an artificial intelligence engine to order each of the plurality of use case experiments; (3) generating, via one or more processors, one or more optimized machine learning models based on the ordered experiments; and (4) causing, via one or more processors, one or more optimized deployment options to be displayed in a client computing device.

In another aspect, a computing system for generating cloud deployments by identifying optimized use cases includes one or more processors; and a memory comprising instructions, that when executed, cause the computing system to: (1) receive, via an electronic network, a plurality of user use case experiments; (2) analyze, via one or more processors, the plurality of user use case experiments using an artificial intelligence engine to order each of the plurality of use case experiments; (3) generate, via one or more processors, one or more optimized machine learning models based on the ordered experiments; and (4) cause, via one or more processors, one or more optimized deployment options to be displayed in a client computing device.

In yet another aspect, a non-transitory computer-readable storage medium stores executable instructions that, when executed by a processor, cause a computer to: (1) receive, via an electronic network, a plurality of user use case experiments; (2) analyze, via one or more processors, the use case information using an artificial intelligence engine to order each of the one or more use case experiments; (3) generate, via one or more processors, one or more optimized machine learning models based on the ordered experiments; and (4) cause, via one or more processors, one or more optimized deployment options to be displayed in a client computing device.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein.

DETAILED DESCRIPTION

Overview

Figure 1A:
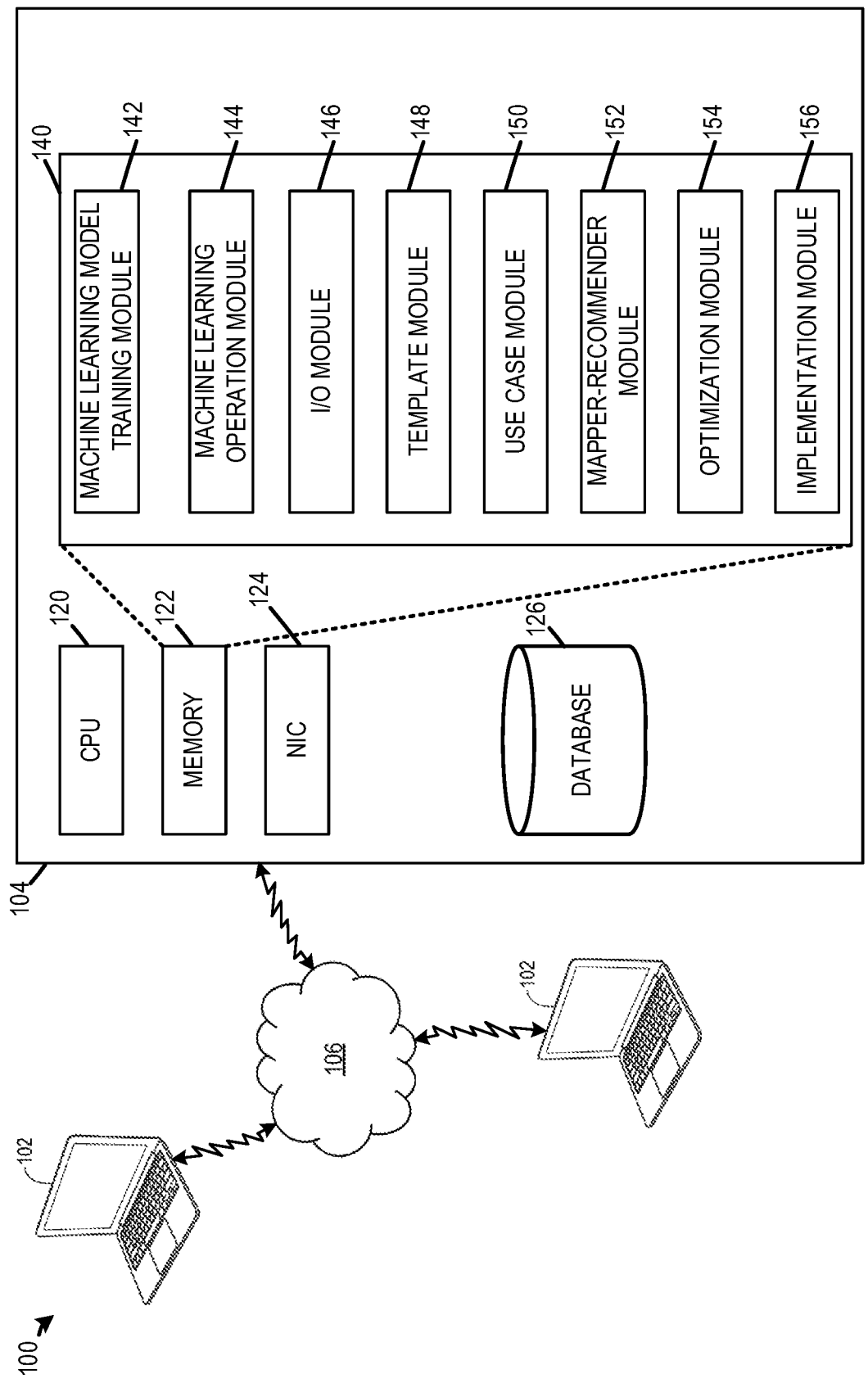
FIG. 1A depicts a computing environment in which artificial intelligence (AI)-based use case model recommendations may be performed, according to some aspects.

The aspects described herein relate to, inter alia, techniques for performing artificial intelligence-based model recommendation, and more particularly, for analyzing information generated via user experiments using artificial intelligence and machine learning, for use cases corresponding to internal user use cases, crowdsourced user use cases and/or discovered use cases.

As discussed below, the present techniques take a proactive approach to enabling non-technical and technical users to experiment and continuously learn/deploy experiments in a computing ecosystem to foster innovation using cutting edge technologies, including contributions from internal users, and in some aspects, crowdsourced users and/or open source contributors, providing a fuller picture of the available technology options than conventional systems. The present techniques enable users to create and deploy one or more software ecosystem including optimized models based on experiments. The deployed software ecosystem may target various platforms, including mixed reality (MR), virtual reality (VR) and tangible reality platforms (e.g., tablets, monitors, touch screens, etc.). Display to both technical and non-technical personas in a dynamic and user-friendly experience represents an improvement over conventional systems that do not distinguish between user skill levels. The present techniques enable users to identify optimized just-in-time, continuously-improved solutions to various use cases, addressing conventional problems related to slow time-to-market of prototypes.

The present techniques enable hyper-personalization based on user inputs, and machine learning directed to classification, mapping and recommendations. Generally, mapping techniques in the present techniques may group use cases and users based on various criteria, including industry, technologies, user persona/skills, etc. In this way, the present techniques enable targeted experimentation that is appropriate for a specific user role (developer, non-developer) such as by the use of a virtual drag-and-drop code editor A recommender may create an optimized environment including one or more machine learning (ML) models, including optimized templating and ranking. The present techniques may provide the user with rankings of experiments the user is building based on quality, and rankings of the user's experiments vis-à-vis any current "champion" solutions, in a champion-challenger paradigm. The present techniques may rank the user's experiments based on how reliable the experiments are, based on automated scoring, user-provided experience feedback, etc. The scoring may be applied to crowdsource experiments, and rankings between internal user and crowdsource user experiments may be generated to accelerate and expedite optimization.

Generally, the present techniques may receive inputs from three sources, including internal users, crowdsource users, and open source sources via web crawling/scraping. Information provided by the internal users and crowdsource users may be codified as electronic objects, stored and ranked (e.g., using champion-challenger). Users may be prompted and guided to provide information via templates that include ML models for filling gaps in user knowledge, and that assist the user in identifying the problem the user seeks to address.

Generally, the system enables the user to establish various use cases, optionally based on/inheriting from existing use cases, and to modify the use cases iteratively via experimentation. Once the user believes that the use case is complete (e.g., it includes one or more highly-ranked trained ML models), the user may choose from a number of convenient and optimized deployment options based on the user's persona, including guided deployments (e.g., step-by-step instructions), low code/no code options (e.g., a one-click deployment) or unguided (e.g., a raw image). The present techniques support multiple deployment target environments, including hybrid clouds, multiclouds, on premises deployments, etc. Generally, the present techniques advantageously improve AI-based use case recommendation techniques by combining business intelligence, application intelligence, technology intelligence and optimization, using data, data modeling, and data science intelligence, optimization and automation. This enables the present techniques to provide general solutions across various industries, clients, types of applications, technology stacks, and data and modeling techniques.

Exemplary Computing Environment

FIG. 1A depicts a computing environment 100 in which artificial intelligence (AI)-based use case model recommendations may be performed, in accordance with various aspects discussed herein. In the example aspect of FIG. 1, computing environment 100 includes client(s) 102, which may comprise one or more computers. In various aspects, client(s) 102 comprise multiple computers, which may comprise multiple, redundant, or replicated client computers accessed by one or more users. The example aspect of FIG. 1A further includes one or more servers 104 that may include one or more servers. In further aspects, the servers 104 may be implemented as cloud-based servers, such as a cloud-based computing platform. For example, servers 104 may be any one or more cloud-based platform(s) such as MICROSOFT AZURE, AMAZON AWS, Terraform, etc. The environment 100 may further include a current computing environment, representing a current computing environment (e.g., on premises) of a customer and/or future computing environment, representing a future computing environment (e.g., a cloud computing environment, multi-cloud environment, etc.) of a customer. The environment 100 may further include an electronic network 106 communicatively coupling other aspects of the environment 100.

For example, the servers 104 may access the current computing environment (not depicted) and/or the future computing environment (not depicted). For example, the servers 104 may establish one or more network socket connections to the future computing environment and/or the current network environment.

As described herein, in some aspects, servers 104 may perform the functionalities as discussed herein as part of a "cloud" network or may otherwise communicate with other hardware or software components within one or more cloud computing environments to send, retrieve, or otherwise analyze data or information described herein. For example, in aspects of the present techniques, the current computing environment may comprise a customer on-premise computing environment, a multi-cloud computing environment, a public cloud computing environment, a private cloud computing environment, and/or a hybrid cloud computing environment. For example, the customer may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the customer). Alternatively, or in addition, aspects of the public cloud may be hosted on-premise at a location owned/controlled by the customer. The public cloud may be partitioned using virtualization and multi-tenancy techniques, and may include one or more of the customer's IaaS and/or PaaS services.

In some aspects of the present techniques, the current computing environment of the customer may comprise a private cloud that includes one or more cloud computing resources (e.g., one or more servers, one or more databases, one or more virtual machines, etc.) dedicated to the customer's exclusive use. In some aspects, the private cloud may be distinguished by its isolation to hardware exclusive to the customer's use. The private clouds may be located on-premise of the customer, or constructed from off-premise cloud computing resources (e.g., cloud computing resources located in a remote data center). The private clouds may be third-party managed and/or dedicated clouds.

In still further aspects of the present techniques, the current computing environment may comprise a hybrid cloud that includes multiple cloud computing environments communicatively coupled via one or more networks (e.g., the network 106). For example, in a hybrid cloud computing aspect, the current computing environment may include one or more private clouds, one or more public clouds, a bare-metal (e.g., non-cloud based) system, etc. The future computing environment may comprise one or more public clouds, one or more private clouds, one or more bare-metal systems/servers, and/or one or more hybrid clouds. The servers 104 may be implemented as one or more public clouds, one or more private clouds, one or more hybrid clouds, and/or one or more bare-metal systems/servers. For example, the servers 104 may be implemented as a private cloud computing environment that orchestrates the migration of a current computing environment implemented as a first hybrid cloud (e.g., comprising two public clouds and three private clouds) to a future computing environment implemented as a second hybrid cloud (e.g., comprising one public cloud and five private clouds).

The client device 102 may be any suitable device (e.g., a laptop, a smart phone, a tablet, a wearable device, a blade server, etc.). The client device 102 may include a memory and a processor for, respectively, storing and executing one or more modules. The memory may include one or more suitable storage media such as a magnetic storage device, a solid-state drive, random access memory (RAM), etc. A proprietor of the present techniques may access the environment 100 via the client device 102, to access services or other components of the environment 100 via the network 106. A customer, or user, of the environment 100 (e.g., a persona, as discussed herein) may access the environment 100 via another client device 102.

The network 106 may comprise any suitable network or networks, including a local area network (LAN), wide area network (WAN), Internet, or combination thereof. For example, the network 106 may include a wireless cellular service (e.g., 4G). Generally, the network 106 enables bidirectional communication between the client device 102 and the servers 104; the servers 104 and the current computing environment; the servers 104 and the future computing environment; a first client device 102 and a second client device 102; etc. As shown in FIG. 1, servers 104 are communicatively connected, via computer network 106 to the one or more client computing devices 102 via network 106. In some aspects, network 106 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 106 may comprise one or more routers, wireless switches, or other such wireless connection points communicating to the components of the environment 100 via wireless communications based on any one or more of various wireless standards, including by non-limiting example, IEEE 802.11a/b/c/g (WIFI), the BLUETOOTH standard, or the like.

The one or more servers 104 may include one or more processors 120, one or more computer memories 122, one or more network interface controllers (NICs) 124 and an electronic database 126. The NIC 124 may include any suitable network interface controller(s), and may communicate over the network 106 via any suitable wired and/or wireless connection. The servers 104 may include one or more input device (not depicted) and may include one or more device for allowing a user to enter inputs (e.g., data) into the servers 104. For example, the input device may include a keyboard, a mouse, a microphone, a camera, etc. In some aspects, the input device may be a dedicated client computing device 102 (e.g., located local to or remote to the servers 104). The NIC 124 may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 106.

The database 126 may be a relational database, such as Oracle, DB2, MySQL, a NoSQL based database, such as MongoDB, or another suitable database. The database 126 may store data used to train and/or operate one or more ML/AI models. The database 126 may store runtime data (e.g., a customer response received via the network 106, internal use case information, crowdsource use case information, scraped use case information, etc.). The servers 104 may implement client-server platform technology that may interact, via a computer bus of the servers 104 (not depicted), with the memory(s) 122 (including the applications(s), component(s), API(s), data, etc. stored therein) and/or database 126 to implement or perform the machine readable instructions, methods, processes, elements or limitations, as illustrated, depicted, or described for the various flowcharts, illustrations, diagrams, figures, and/or other disclosure herein.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 140, implemented as respective sets of computer-executable instructions (e.g., one or more source code libraries, trained machine learning models such as neural networks, convolutional neural networks, reinforcement learning instructions, etc.) as described herein.

In general, a computer program or computer based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

For example, in some aspects, the computing modules 140 may include a ML model training module 142, comprising a set of computer-executable instructions implementing machine learning training, configuration, parameterization and/or storage functionality. The ML model training module 142 may initialize, train and/or store one or more ML models, as discussed herein. The trained ML models may be stored in the database 126, which is accessible or otherwise communicatively coupled to the servers 104. The modules 140 may store machine readable instructions, including one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. The ML training module 142 may train one or more ML models (e.g., an artificial neural network). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one or more gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs.

Figure 3:
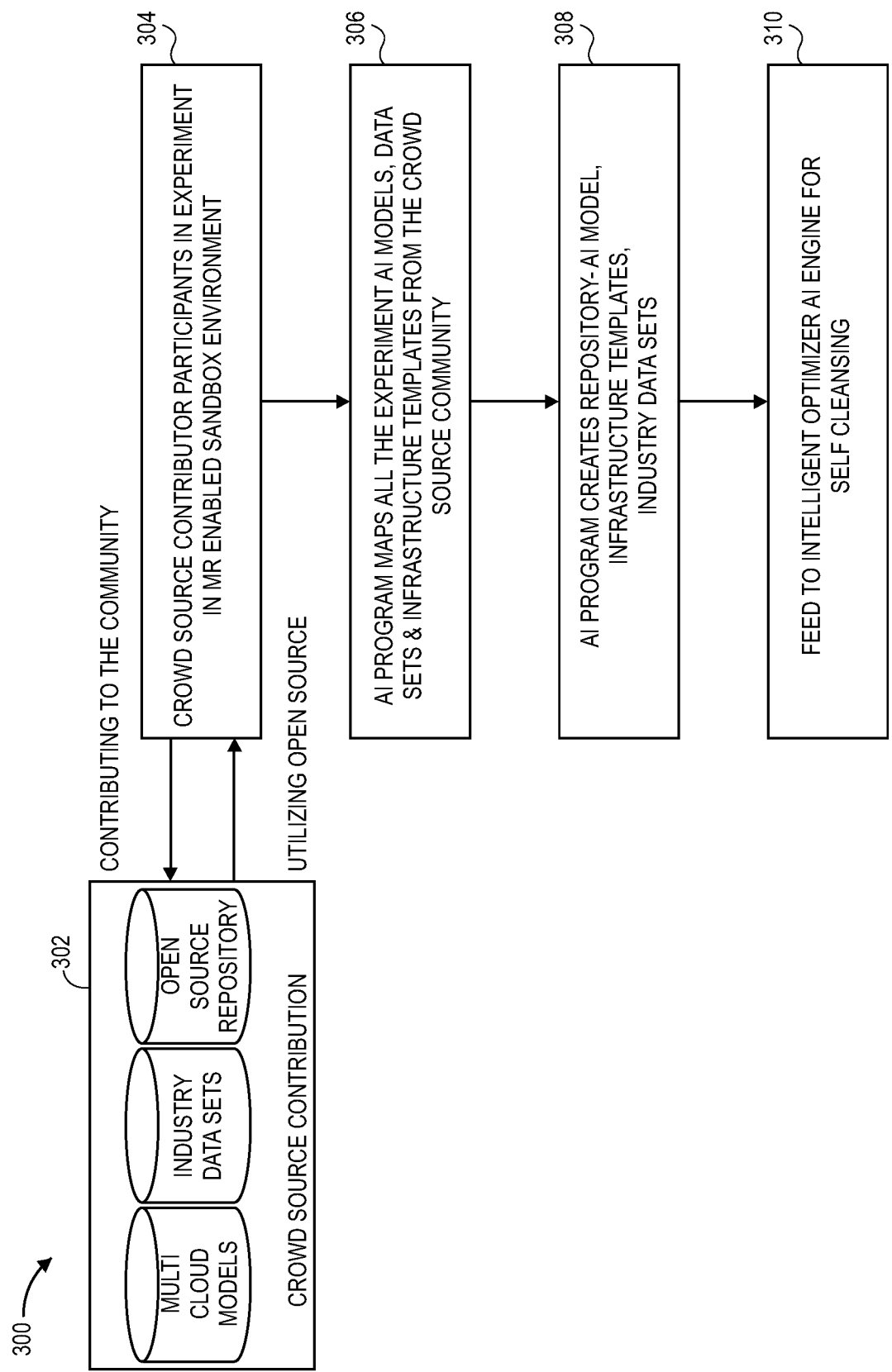
FIG. 3 is an exemplary block flow diagram depicting a computer-implemented method for receiving and processing crowd-sourced use case information in a mixed-reality (MR) environment, according to some aspects.
Figure 5:
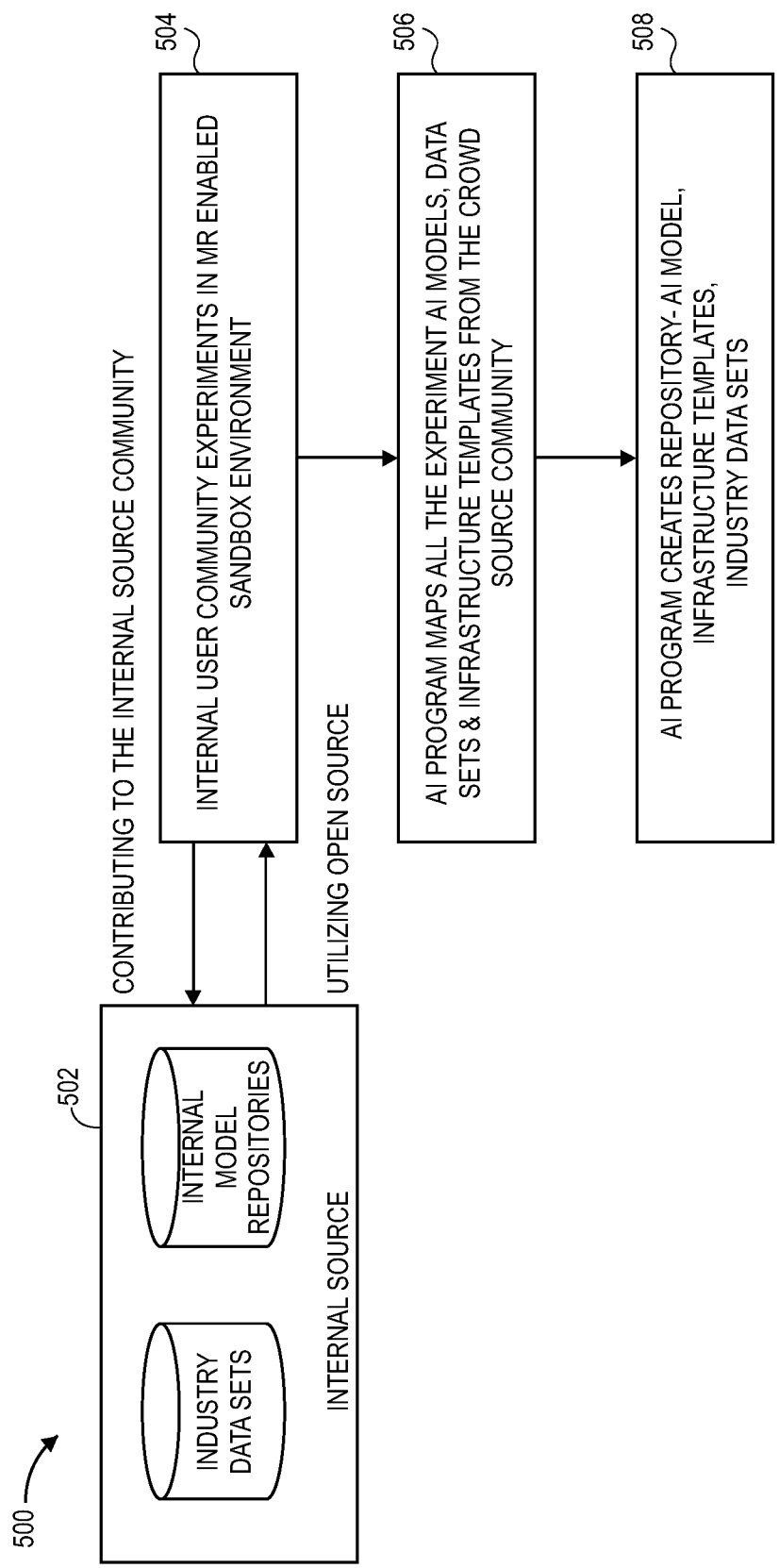
FIG. 5 is an exemplary block flow diagram depicting a computer-implemented method for receiving and processing internal use case information in an MR enabled environment, according to some aspects.

For example, the ML training module 142 may receive labeled data at an input layer of a model having a networked layer architecture (e.g., an artificial neural network, a convolutional neural network, a deep neural network, etc.) for training the one or more ML models to generate ML models (e.g., the ML models of FIG. 3, FIG. 5, etc.). The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more machine learning models. The output layer may be trained to output a prediction, for example.

The data used to train the ANN may include heterogeneous data (e.g., textual data, image data, audio data, etc.). In some aspects, multiple ANNs may be separately trained and/or operated. In some aspects, the present techniques may include using a machine learning framework (e.g., Keras, scikit-learn, etc.) to facilitate the training and/or operation of machine learning models.

In various aspects, an ML model, as described herein, may be trained using a supervised or unsupervised machine learning program or algorithm. The machine learning program or algorithm may employ a neural network, which may be a convolutional neural network, a deep learning neural network, and/or a combined learning module or program that learns in two or more features or feature datasets (e.g., structured data, unstructured data, etc.) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be based on, or otherwise incorporate aspects of one or more machine learning algorithms included as a library or package executed on server(s) 104. For example, libraries may include the TensorFlow based library, the Pytorch library, and/or the scikit-learn Python library.

Machine learning may involve identifying and recognizing patterns in existing data (such as data risk issues, data quality issues, sensitive data, etc.) in order to facilitate making predictions, classifications, and/or identifications for subsequent data (such as using the models to determine or generate a classification or prediction for, or associated with, applying a data governance engine to train a descriptive analytics model).

Machine learning model(s), may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. In the present techniques, unsupervised learning may be used, inter alia, for natural language processing purposes (e.g., for performing topic modeling of words for mapping of personas, industries, etc.) and to identify scored features that can be grouped to make unsupervised decisions (e.g., numerical k-means).

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques. In various aspects, training the ML models herein may include generating an ensemble model comprising multiple models or sub-models, comprising models trained by the same and/or different AI algorithms, as described herein, and that are configured to operate together.

In some aspects, the computing modules 140 may include a machine learning operation module 144, comprising a set of computer-executable instructions implementing machine learning loading, configuration, initialization and/or operation functionality. The ML operation module 144 may include instructions for storing trained models (e.g., in the electronic database 126, as a pickled binary, etc.). Once trained, a trained ML model may be operated in inference mode, whereupon when provided with de novo input that the model has not previously been provided, the model may output one or more predictions, classifications, etc. as described herein. In an unsupervised learning aspect, a loss minimization function may be used, for example, to teach a ML model to generate output that resembles known output.

The architecture of the ML model training module 142 and the ML operation module 144 as separate modules represent advantageous improvements over the prior art. In conventional computing systems that include multiple machine learning algorithms, for performing various functions, the models are often added to each individual module or set of instructions independent from other algorithms/modules. This is wasteful of storage resources, resulting in significant code duplication. Further, repeating ML model storage in this way may result in redundant retraining of the same model aspects, wasting computational resources. By consolidating ML model training and ML model operation into two respective modules that may be reused by any of the various ML algorithms/modeling suites of the present techniques, waste of storage and computation is avoided. Further, this organization enables computational training work to be organized by a task scheduling module (not depicted), for efficiently allocating computing resources for training and operation, to avoid overloading the underlying system hardware, and to enable training to be performed using distributed computing resources (e.g., via the network 106) and/or using parallel computing strategies.

In some aspects, the computing modules 140 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 106 and/or the client 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

The I/O module 146 may further include or implement an operator interface configured to present information to an administrator or operator and/or receive inputs from the administrator and/or operator (e.g., via the client computing device 102). An operator interface may provide a display screen. I/O module 146 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML training module 142, and/or perform other functions (e.g., operation of one or more trained models via the ML operation module 144). In some aspects, the I/O module 146 may include one or more sets of instructions for receiving inputs via a virtual reality interface, a mixed reality interface and/or an augmented reality interface (e.g., via a tablet hardware device, such as the client computing device).

In some aspects, the computing modules 140 may include a template module 148, comprising a set of computer-executable instructions implementing templating functionality. The template module 148 may generate one or more electronic template forms, which are electronic objects including a plurality of fields describing user input (e.g., use case information). The electronic template forms may be used to describe the contents of a use case, and may be modified based on one or more user persona. The electronic template form may comprise computer-executable code that can be evaluated by a graphical user interface (e.g., a web browser). For example, components of the computing environment may be displayed using a nested hierarchical view (e.g., a tree view), using a flat list, using an interactive object-based view, etc. The template module 148 may include respective sets of instructions for generating one or more templates for use in collecting internal use case information, crowdsourced use case information and/or industry insight use case information, as discussed herein.

In some aspects, the computing modules 140 may include a use case module 150, comprising a set of computer-executable instructions for collecting use case information using one or more trained ML model. The use case information may correspond to one or more of internal use cases (e.g., information proprietary to the owner of the environment 100), crowdsourced use case information, or industry insights use case information. The use case module 150 may include instructions for establishing and maintaining a logical grouping of information within the environment 100. In particular, the use case module 150 may associate a plurality of properties (e.g., use case name, use case duration, use case allowed personas, use case requirements, etc.) with one or more individual use case objects. The use case module 150 may store the use case objects as persistent objects (e.g., in the memory 122, the electronic database 126, etc.). The use case module 150 may group the use cases and associated properties according to one or more topics. For example, a use case may be named "Amazon Web Services->Google Cloud Platform." The use case module 150 may group this use case into a "Cloud-to-Cloud Migration" topic that includes one or more additional use cases. Other topics may be defined, such as "cloud-to-on-premises," "on-premises to hybrid cloud," etc. Those of ordinary skill in the art will appreciate that many combinations are possible, both of cloud migration-related topics, and others, as discussed herein. The use case module 150 may also associate a type with each use case object (e.g., one of internal, crowdsourced, discovered, etc.) reflecting the provenance of each use case object.

In some aspects, the computing modules 140 may include a mapper-recommender module 152, comprising a set of computer-executable instructions for generating mappings and recommendations using one or more trained ML model. Specifically, the mapper-recommender module 152 may include instructions for comparing internal use case objects, crowdsourced use case objects and/or discovered use case objects, as discussed herein. For example, the mapper-recommender module 152 may include instructions for mapping a user to a use case (e.g., by industry), and for scoring the use case based on predicted efficiency of the use case would perform, as generated by one or more trained ML models, according to one or more features. Such features may include, for example, use case speed (i.e., wall clock time to perform the use case), use case time-to-market, use case computational resource consumption (e.g., cloud resources, APIs, etc.), use case out-of-pocket cost, etc. The predicted efficiency may be based on a supervised or unsupervised ML technique. For example, the proprietor of the environment 100 may possess a large data set of historical projects, including one or more of the aforementioned features. The ML model training module 142 may include instructions for training the trained ML model to predict an efficiency score by analyzing this labeled data set, in some aspects. The ML model training module 142 may include instructions for generating the labels, in some aspects, including optionally using unsupervised learning techniques (e.g., clustering).

Those of ordinary skill in the art will appreciate that depending upon the use case topic more or fewer efficiency features may be used to train the one or more trained ML models to predict the respective use case efficiency (i.e., to score the respective use cases). The present techniques may include sets of executable instructions for training one or more ML models for predicting scores that enable comparison of a plurality of use cases of differing provenance (e.g., two cloud migration use cases (one internal and one crowdsourced) may receive a respective score, that may be compared with yet another score corresponding to an AI-industry technology insights use case generated by the intelligent optimizer AI engine. Thus, the present techniques advantageously enable use cases to be directly compared, regardless of whether those respective use cases emanate from an internal source, a crowdsource source, or an insights source. This comparison has several benefits, including avoiding bias inherent to the use case recommendation process. Another benefit is the provision of a larger solution that includes multiple components, each optimized according to the techniques described herein.

In some aspects, the computing modules 140 may include an optimization module 154, comprising a set of computer-executable instructions for optimizing models using one or more trained ML model. The optimization module 154 may include one or more sets of computer-executable instructions for operating one or more trained ML models (e.g., a trained mapper ML model and/or a trained recommender model via the mapper-recommender module 154). The optimization module 154 may include one or more sets of rules for comparing outputs produced by the trained models included in the mapper-recommender module 152. Furthermore, the optimization module 154 includes a set of computer-executable instructions that enable the environment 100 to operate in a continuous cycle of optimization, whereupon information (e.g., rankings of the champion-challenger technique of the mapper-recommender 152) are updated as soon as new use cases are input.

In some aspects, the computing modules 140 may include an implementation module 156, comprising a set of computer-executable instructions for implementing optimized models. The implementation module 156 may enable use case prototyping (including prototyping based on virtual reality, augmented reality and/or mixed reality paradigms), step-by-step deployment generation, and/or one-click deployment generation. Specifically, the implementation module 156 may output instructions (e.g., modular code) that engineers may deploy via a single click and/or written instructions that may include corresponding instructions. In the above-referenced continuous cycle of optimization, the implementation module 156 may include instructions for enabling the user to modify/improve the use case, and to re-rank the use case.

The computing modules 140 may include more or fewer modules, in some aspects. For example, in some aspects, the computing modules 140 may include a knowledge generation module (not depicted), comprising a set of computer-executable instructions implementing knowledge generation functionality. The knowledge generation module may include instructions for accessing and analyzing data from various sources (e.g., structured data, unstructured data, semi-structured data, streaming data, data external to the computing environment 100, etc.) and training one or more ML models based on the accessed data to generate one or more trained ML models that may include one or more knowledge engines, composite ML models, etc. Specifically, the knowledge generation module may include a set of computer-executable instructions for scraping information from one or more data sources (e.g., a subscription website) and for storing the information representing latest industry insights in an information repository (e.g., the electronic database 126). The knowledge generation module may include instructions for extracting information from the scraped information, to generate discovered electronic use case objects. Like internal use case objects and crowdsourced use case objects, the discovered electronic use case objects may be stored in the database 126 and/or the memory 122.

Exemplary AI-Based Use Case Computer-Implemented Methods

Figure 1B:
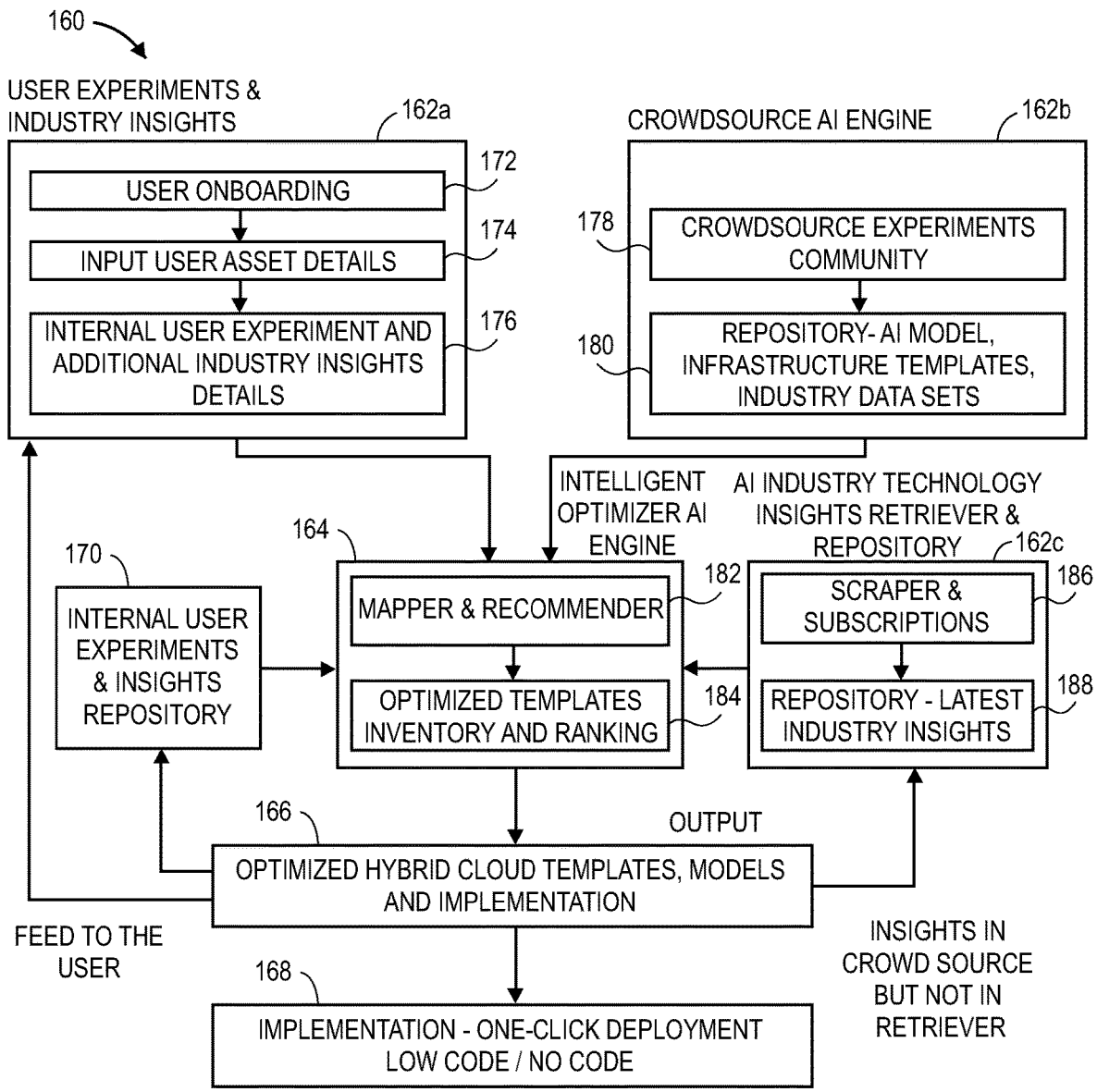
FIG. 1B is an exemplary block flow diagram depicting a computer-implemented method for receiving and processing use case information, according to some aspects.

FIG. 1B is an exemplary block flow diagram depicting a computer-implemented method 160 for receiving and processing use case information, according to some aspects. The method 160 may include receiving user experiments and industry insights information (block 162*a*). The method 160 may include performing user onboarding, by loading one or more template and repeatedly collecting information (e.g., internal use case information) from a user via the template (block 172). For example, with reference to FIG. 1, the use case module 150 (or another module of the modules 140) may cause a template to be generated (e.g., by the template module 148) and displayed in the client computing device 102. The template may include instructions for receiving one or more inputs from the user (i.e., one or more template parameters), generally referred to as internal use case information. For example, a first input may be a name of the use case. A second input may be a selection corresponding to the persona of the user (e.g., developer, business user, prototype engineer, etc.). The user at block 162*a* may be an employee of the proprietor of the present techniques.

The use case module 150 may cause the ML operation module 144 to load and initialize an additional request parameter prediction model corresponding to the persona and/or the use case. For example, the ML operation module 144 may load an ML model specifically trained for a persona (e.g., a developer) to address a use case (e.g., perform a cloud migration), in an aspect. Additional personae and use cases are described herein. The ML operation module 144 may process the inputs provided by the user using the additional request parameter prediction model, to predict one or more additional request parameters. For example, the loaded model may be pre-trained to predict a request parameter of "persona=developer" when the use case name input provided by the user is "cloud migration." The use case module 150 may embed the additional request parameters in the template and cause the template to be re-displayed to the user. The additional request parameters may include one or more parameters directed to the use case. For example, when the user inputs "syringe" as the use case name, the additional request parameter prediction model may predict a request parameter of "topic=medical device." The inferred topic request parameter may be used by the template module 148 to embed additional request parameter specific to a medical device use case.

In some aspects, the template module 148 may retrieve information corresponding to the user's use case, and pre-fill the additional request parameters with the retrieved information. For example, based on the predicted request parameter of "topic=medical device," and the use case name of "syringe," the use case module 150 may retrieve a stored syringe use case object from the database 126 that is associated with the medical devices topic. The use case module 150 may cause the template module 148 to parameterize the additional request parameters in the template using information included in the retrieved syringe use case object. For example, this could include a "volume" request field in the template being pre-filled to a particular parameter value, such as 50 ml. The on-boarded user may modify this value, or leave it as is before submitting the pre-filled template to the servers 104 for processing. The use case object may include one or more ML models, a set of instructions (e.g., an algorithm, a cloud migration strategy), a three-dimensional object model (e.g., a computer-aided design model), etc. The use case object may be associated with one or more electronic template objects and one or more data sets.

By correctly inferring the persona of the user and/or topical information regarding the use case, and by embedding related parameters in the onboarding template at block 172, the present techniques advantageously quicken the overall onboarding process of block 162*a*, by limiting the number of questions that the user is required to answer, and the number of request/response cycles required to onboard the user. In this way, the present techniques provide a smart, template-based user experience for onboarding internal use cases by both technical and non-technical users, wherein the view of the input is hyper-personalized for the persona and/or the use case—i.e., a 360 view of both the use case and the user persona. The present techniques advantageously accommodate user onboarding by closing gaps, helping users navigate among various tools, leveraging existing data to improve the user experience.

The method 160 may include receiving input user asset details (block 174). As noted, input user asset details may include customer-360 and use case-360 information that enables the use case module 150 to logically link use cases to other use cases, and use cases to personas, and personas to personas. For example, at block 174, the use case module 150 may receive additional information from the user identifying the user's relationship to an existing use case object (e.g., via the user selecting a topic, persona, use case object, etc. from a dropdown box). In some aspects, the method 160 may include receiving internal user experiment information and/or additional industry insights/details.

In some aspects, the method 160 may include processing crowdsourced use case information via a crowdsource AI engine (block 162*b*). In general, crowdsourced use case information may, but need not, include information provided by non-employees of the proprietor of the present techniques. With reference to FIG. 1, the crowdsource AI engine at block 162*b* may comprise one or more ML models trained by the ML model training module 142, and operated by the ML operation module 144. The method 160 may include receiving crowdsourced use case experiments from one or more community users (block 178). Use case experiments are described further below, in reference to FIG. 2. The crowdsource experiments may include one or more crowdsourced use case objects using one or more templates as described with respect to block 162*a*. That is, particular crowdsource templates may be generated by the template module 148 that include one or more sets of input parameters for crowdsourced use case information. The ML operation module 144 may access and operate one or more pre-trained ML models to process user input, and to predict additional request parameters. The crowdsourced use cases may correspond (i.e., be associated with) one or more use cases. It should be appreciated that in some embodiments, the block 162*b* is entirely omitted from the method 160— i.e., no crowdsourcing operations are performed. It should also be appreciated that the use case objects generated via the on-boarding process at block 162*a* and at block 162*b* are fungible, i.e., are similar in structure (e.g., as native database objects, JSON-encoded data structures, etc.) such that they can be processed by a single set of instructions (e.g., a single trained ML model), for example at block 164, as discussed below.

In still further aspects, the method 160 may include receiving and processing AI-industry technology insights use case information (block 162*c*). For example, as discussed above, the method 160 may scrape information or retrieve information from a third-party information service (e.g., via a licensed API) over the network 106 of the environment 100. With reference to FIG. 1, the optimizer module 154 may retrieve the scraped/retrieved information (e.g., via the database 126) and cause one or more instances of the mapper-recommender module 152 to process the scraped/retrieved information to compare and/or rank the use case object.

In yet further aspects, the method 160 may include analyzing industry technology use case information in its raw or semi-processed form, without extracting specific use cases via one or more specialized engines including, for example, a data structure engine, a data quality and remediation engine, a data governance engine, a global data/enterprise engine, a data pipeline pattern engine, a technical modules engine, a pattern knowledge engine; and/or a data visualization engine (not depicted). More or fewer knowledge engines may be included in some aspects. In some aspects, the knowledge engine may search for use cases based on the user-360 and/or use case-360 information collected at step 162*a*. For example, the knowledge engine may include a set of computer-executable instructions for scraping a website for open source code (e.g., GitHub.com, BitBucket.com, etc.) using the topic provided by the user to determine whether a more efficient use case can be identified. It will be appreciated that in some aspects, the block 162*c* is omitted from the method 100 (i.e., no AI industry technology insights use case information is received or processed). Further, the receipt and processing of crowdsourced use cases at block 162*b* and the receipt and processing of AI industry technology insights use cases at block 162*c* may be subject to various legal and administrative realities (e.g., third-party copyright licensing).

In some aspects, the method 160 may include analyzing the use case information (e.g., the internal use case information received at block 162*a* and/or the crowdsourced use case information received at block 162*b*; two different internal use case objects corresponding to respective internal use case information received from two respective users at block 162*a*; two different crowdsourced use case objects; etc.) using an intelligent optimizer AI engine (block 164). With reference to FIG. 1, the intelligent optimizer AI engine may correspond to the optimization module 154, in some aspects. As stated above, the optimization module 154 may include one or more sets of computer-executable instructions for operating one or more trained ML models. In some aspects, the optimization module 154 may cause one or more instances of the mapper-recommender module 152 to process the use case information in parallel (block 182), and may further execute rules to compare and/or rank one or more use case objects and/or to generate one or more optimized templates based on the inventory and ranking of the use case objects (block 184). As discussed herein, one or more ML-based ranking strategies may be used, including a champion-challenger-based strategy.

The method 160 may include generating one or more optimized hybrid cloud templates, one or more optimized ML models, and/or one or more implementations based on the rankings (block 166). The method 160 may choose one or more models, according to the ranking of relevant features, as discussed above. For example, in an aspect, the mapper-recommender module 164 may use regression and/or classification ML model to provide a respective score corresponding to a number of experiments, enabling the experiments to be ranked according to efficiency, performance, reliability or other metrics. For example, in an aspect, the ranking may include a different performance score according to the user persona (e.g., a differing score for an engineer, data scientist, etc.). The experiment of each disparate user may be ranked according to various metrics, such as a composite ranking comprising reliability and leveraging of solutions provided by other users. The method 160 may select one or more associated templates based on the chosen one or more models. Additional implementation information may be generated at block 166, including scaffolding required to operate the model, for example. Further in some aspects, the method 160 may include analyzing the optimized and ranked experiments using data in an internal user experiments and insights repository (block 170). This additional analysis is discussed below.

The method 160 may include outputting an implementation (block 168). For example, the output implementation may be a mixed-reality object, a virtual-reality object, an augmented reality object, a list of implementation steps to follow, an executable code (e.g., a one-click deployment), etc. The output may depend on the state of the method 160. The output may be based on a persona of the user. For example, when the persona is one of an engineer, the output may be a templatized, codified solution enabling the user to see and use the output code immediately, e.g., for learning, deployment, etc. In this case, the output may include a one-click deployment, or a manual deployment enabling the user to develop an infrastructure as a service to use for the developer's own purposes. When the persona is that of a business person, the output may include a low code, no code option. In particular, the method 160 may further include generating a dynamic view that enables a non-technical person to drag-and-drop building blocks to modify the deployment and/or to perform a one-click deployment.

In the virtual reality case, the user may use trial-and-error (e.g., perform specific experiments and learn from trials). An example of this implementation is an augmented reality environment that enables users to interact with the touch screen. For example, in a medical devices use case (e.g., an injection needle), the method 160 may enable the user to experiment with training one or more ML models to have different fluid flow rates, different fluidities, etc. The user may modify physical parameters in the experimental environment without the need to create the physical device itself. For example, the use may increase/decrease the needle diameter, the fluid density, etc. and save results of the experimental models (e.g., in the memory 122). In still further aspects, the user may create results based on the experiments in physical form (e.g., via a 3-dimensional print of the modeled object).

Thus, the present techniques advantageously enable continuous designing and redesigning of systems, using an experiment-based strategy, while and helping users to quickly adapt their products to a rapidly technologically advancing environment. By modeling in virtual reality, mixed reality and/or augmented reality, the present techniques avoid waste of discarded prototype materials. Users are enabled to visualize a proposed device, in a safe trial and error environment, and to create their own experimental data through observation. This is of particular import to industries that require physical experimentation, such as mining, medical device development, etc. In these domains, users need to be able to view the device in physical or simulated physical form for observational experimentation, trial and error. As discussed above, the present techniques are designed to provide users with a continuous, proactively updated modeling ecosystem. Further, as discussed, the continuous cycle of optimization that uses, in some aspects, a champion-challenger approach (wherein the challenger is a crowdsourced or free/open source solution) enables the meritocratic comparison of competing solutions while eliminating bias. The present techniques are also extendible, in that modularized code developed in previous experiments may be re-used, studied, modified and adopted.

Figure 2:
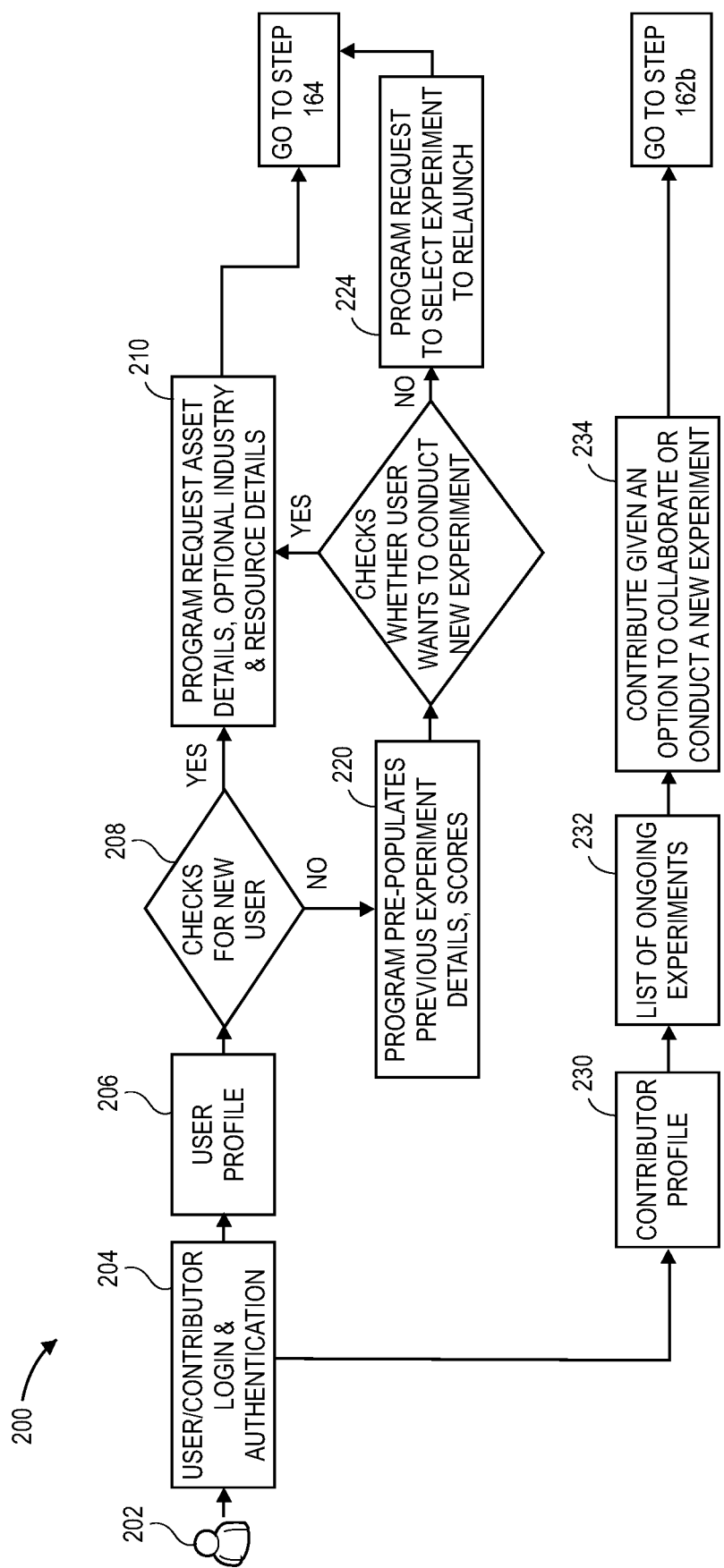
FIG. 2 is an exemplary block flow diagram depicting a computer-implemented method for receiving and processing use case information, according to some aspects.

FIG. 2 is an exemplary block flow diagram depicting a computer-implemented method 200 for receiving and processing use case information, according to an aspect. Some portions of the method 200 may correspond to respective portions of the method 160, in some aspects. The method 200 may include receiving user/contributor login and authentication corresponding to a user 202 (block 204). The method 200 may include determining whether the user is an internal user or a contributor user by retrieving a user profile (block 206).

When the user is an internal user, the method 200 may include determining whether the internal user is a new user (i.e., whether the internal use has ever logged in before), and when the user is new, requesting use case details (e.g., asset details, industry details, and/or resource details) from the user using a corresponding template (block 210). Specifically, the method 200 may be performed by the template module 148 and the use case module 150, in some aspects. The information received at block 210 may be analyzed using one or more ML models, as discussed above, to determine one or more additional request parameters to request from the user. Control flow of the method 200 may pass to block 164 of FIG. 1B.

When the user is not new, at block 208, the method 200 may include pre-populating one or more user interfaces with previous use case information associated with the user (e.g., experiment details, use case information, use case scores, etc.) (block 220). This step of the method 200 may include causing the previous use case experiments to be displayed in a display device (e.g., the client computing device 102 used by the user).

The method 200 may then determine whether the user wants to conduct a new experiment, and if so, the method 200 may request use case details (reverting to block 210). When the user does not wish to begin a new experiment, the method 200 may include requesting that an experiment relaunch (block 224) and control flow of the method 200 may pass to block 164 of FIG. 1B.

When the user is a contributor user, the method 200 may retrieve a corresponding contributor profile (e.g., from the electronic database 126) (block 230). The method 200 may cause a list of ongoing use case experiments to be displayed in a display device (e.g., the client computing device 102 used by the user). The displayed information may include a template that enables the user to collaborate via an existing or new use case experiment (block 234). Control flow of the method 200 may then pass to block 162b of FIG. 1B. Regardless of whether the user is an internal user or a contributor user, receiving collaborations of the user may include receiving one or more contributions to a use case experiment via a virtual reality interface, a mixed reality interface and/or augmented reality interface (e.g., via the I/O module 146 of FIG. 1A).

FIG. 3 is an exemplary block flow diagram depicting a computer-implemented method 300 for receiving and processing crowd-sourced use case information in a mixed-reality (MR) environment, according to an aspect. The method 300 includes receiving and transmitting crowd-sourced contributions in a set of data sources, including for example, a multi-cloud models database, an industry data sets database, and an open source repository database (block 302). As will be appreciated by those of ordinary skill in the art, the databased of block 302 may be stored in a single electronic database (e.g., the database 126 of FIG. 1A) or in multiple instances thereof. The method 300 may include capturing contributions from users of a mixed-reality sandbox environment (e.g., via the I/O module 146 of FIG. 1) and/or receiving open source code and/or data in the MR sandbox environment (block 304). The method 300 may include mapping one or more use case experiments including one or more trained ML models, one or more data sets and one or more templates created by users of the MR sandbox environment (block 306).

The mapping may be performed using the mapper-recommender module 152 and/or the optimization module 154 of FIG. 1, for example. The mapping may include generating a repository including the one or more trained ML model, the one or more templates, and/or the one or more industry data sets (block 308). An intelligent optimizer AI engine (e.g., at block 164 of FIG. 1B) may perform a self-cleansing routine (block 310). The self-cleansing routine may include cleaning various data cleaning/sanitization aspects, including marking data based on one or more user attributes, for example, when data in the repository is available to a user, but requires support that exceeds the user's skill level.

Another example of data cleaning is annotating certain models (e.g., open source models) that are limited by open source libraries, for example, for software package dependency purposes or for legal, compliance or regulatory purposes. Thus, an advantage of the present techniques is that it does not assume that users performing experiments are experts in compliance/regulatory requirements. Yet another example of data cleaning at block 310 is generating additional data that would be found, for example, in a sophisticated production computing environment. Such generation may be performed using ML, in some aspects.

Figure 4:
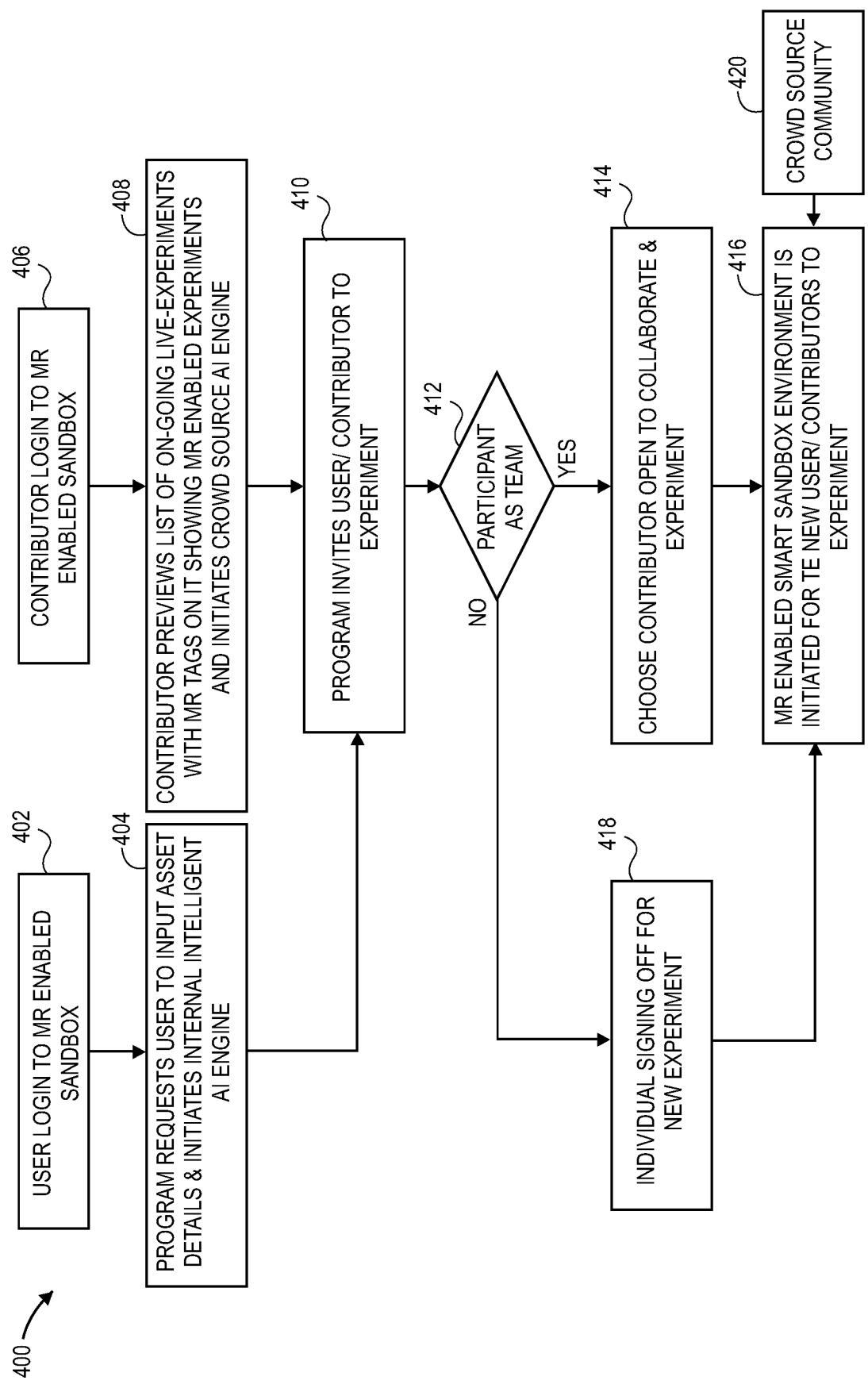
FIG. 4 is an exemplary block flow diagram depicting a computer-implemented method for receiving and processing team-collaborative crowd-sourced use case information, according to some aspects.

FIG. 4 is an exemplary block flow diagram depicting a computer-implemented method 400 for receiving and processing team-collaborative crowd-sourced use case information, according to some aspects. The method 400 may include one or both of i) receiving an internal user login to a MR enabled sandbox (block 402); and ii) receiving a contributor user login to the MR enabled sandbox (block 406). The sandbox may correspond to the MR sandbox depicted in FIG. 3. The method 400 may include one or both of i) receiving user asset details from the internal user (block 404); and ii) receiving user asset details from the contributor user (block 408). The method 400 may include inviting the one or more users (whether an internal user and/or a contributor user) to participate in an experiment together (block 410).

When one or both of the users choose to participate, the method 400 may include choosing the contributor block and initializing a new experiment object (block 414). As discussed above, the experiment object may be associated with one or more use cases. The method 400 may further include initializing the MR enabled sandbox environment and allowing the users to experiment, by receiving changes to experiment parameters. When one or both of the users choose not to participate as a team, the user may be redirected to a new solo experiment (block 418). In some aspects, the method 400 may receive collaboration from crowd source users (block 420).

FIG. 5 is an exemplary block flow diagram depicting a computer-implemented method 500 for receiving and processing internal use case information in an MR enabled environment, according to some aspects. The method 500 includes receiving and transmitting internally-sourced contributions in a set of data sources, including for example, an industry data sets database, and an internal model repository database (block 502). As will be appreciated by those of ordinary skill in the art, the databased of block 502 may be stored in a single electronic database (e.g., the database 126 of FIG. 1A) or in multiple instances thereof. The method 500 may include capturing contributions from internal users of a mixed-reality sandbox environment (e.g., via the I/O module 146 of FIG. 1) and/or receiving open source code and/or data in the MR sandbox environment (block 504). The method 500 may include mapping one or more use internal user community case experiments including one or more trained ML models, one or more data sets and one or more templates created by users of the MR sandbox environment (block 306). As in the method 300, the method 500 may include mapping the experimental model, data sets and templates (block 506) and generating a repository including the information (block 508). Thus is seen another significant advantage of the present techniques; namely, that the methods and systems described herein (in particular method 300 and method 500) enable the proprietor of the present techniques to systematically and continuously enable different populations of users (e.g., internal users, crowd source users) to collaboratively experiment. The method 500 may include or omit the self-cleaning steps discussed with respect to the method 300.

Figure 6:
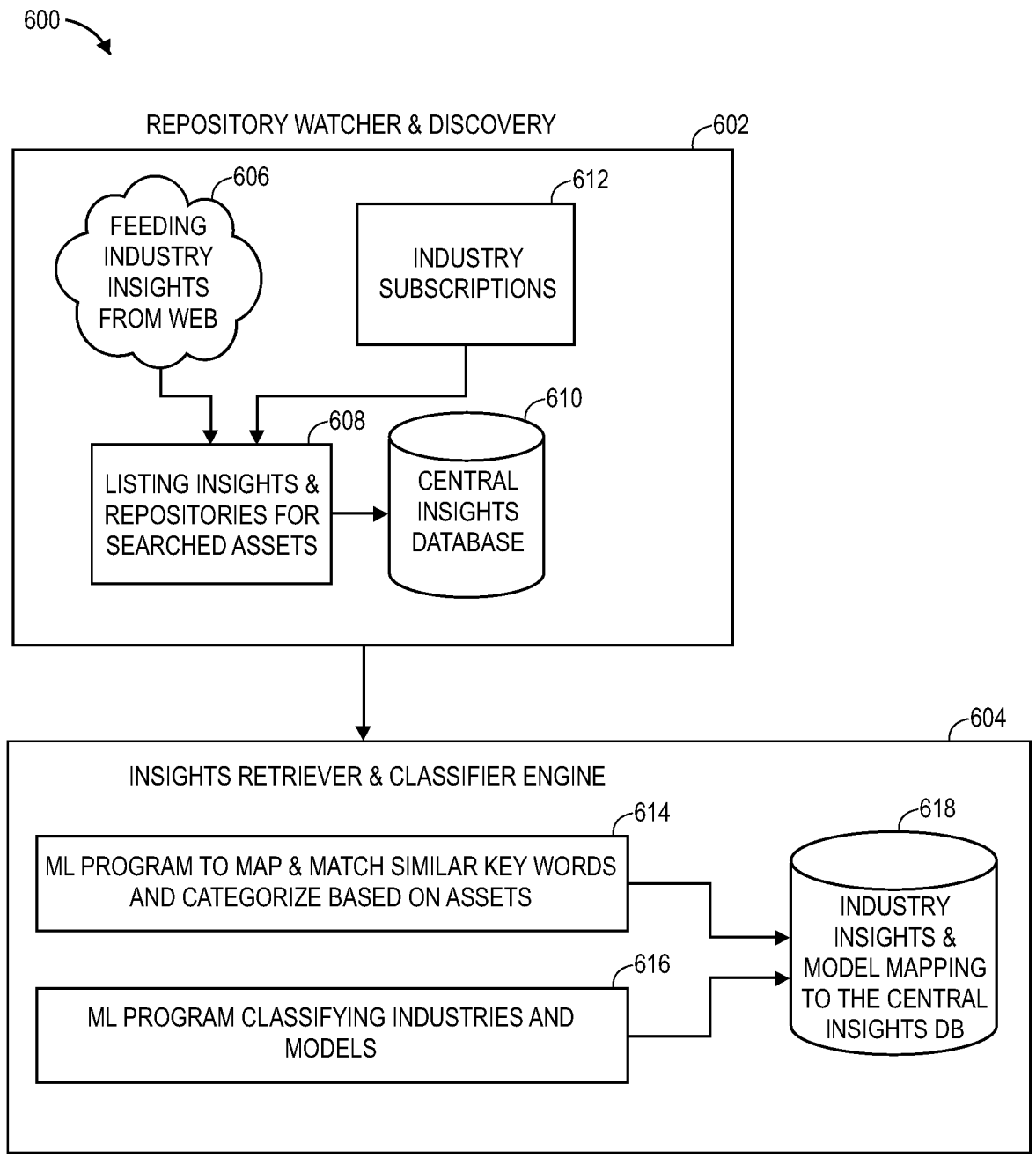
FIG. 6 is an exemplary block flow diagram depicting a computer-implemented method for repository monitoring and insights retrieval and classification, according to some aspects.

FIG. 6 is an exemplary block flow diagram depicting a computer-implemented method 600 for repository monitoring and insights retrieval and classification, according to some aspects. The method 600 includes monitoring for insights and storing the insights in a repository (block 602) and retrieving and classifying the insights using a trained ML model (block 604). The method 600 may include receiving, periodically and/or continuously, industry insights from a data source (e.g., one or more Internet-based sources) (block 606). The method 600 may include listing insights and repositories for searched assets (block 608) and storing identified insights in a central insights database (e.g., the database 126 of FIG. 1A) (block 610). In some aspects, receiving the industry insights may include receiving one or more industry subscriptions that may not be openly accessible via the Internet (block 612). The method may include retrieving a set of similar insights based on key word similarity, for example, using an unsupervised learning ML model (block 614). In some aspects, the method may include categorizing the set of similar insights based on one or more assets identified within those insights. The method 600 may include classifying one or more industries and one or more models (block 616). The classification may be performed using any suitable classifier (e.g., a Bayesian classifier, a binary classifier, a regression classifier, reinforcement learning, an SVM, a neural network, etc.). The output of the matching, categorization and classification may be stored in an industry insights database, with a mapping (e.g., a primary key) associating the output to the respective corresponding records in the central insights database at block 610 (block 618).

Figure 7:
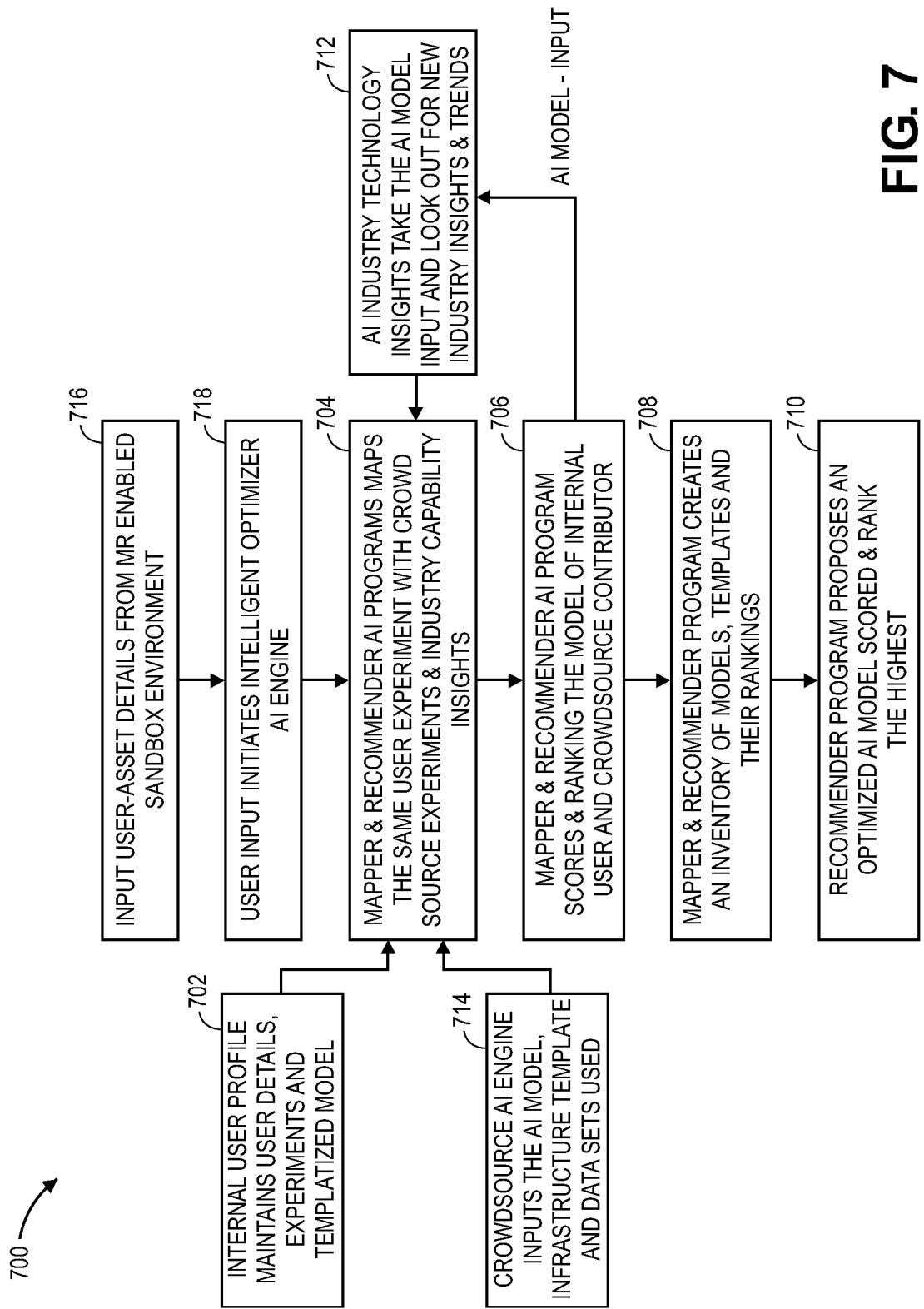
FIG. 7 is an exemplary block flow diagram depicting a computer-implemented method for scoring and ranking internal user models and crowdsource user models, according to some aspects.

FIG. 7 is an exemplary block flow diagram depicting a computer-implemented method 700 for scoring and ranking internal user models and crowdsource user models, according to some aspects. The method 700 may include receiving an internal user profile, including the user's details (e.g., name, email, etc.), an indication of one or more experiments associated with the user, and an indication of one or more ML models associated with the experiment, including any templates associated with the respective ML models (block 702). The method 700 may further include receiving one or more AI models (e.g., one or more crowdsourced ML models) from a crowdsource AI engine, including associate templates and data sets (block 714). The information received at the block 714 may be generated at block 308 of FIG. 3, in some aspects.

The method 700 may include mapping the one or more ML models associated with the user experiment to the one or more experiments associated with the user to the one or more AI models from the crowdsource AI engine (block 704). For example, each respective one or more ML models may be linked, using one or more trained ML models, with the one or more AI models from the crowdsource AI engine. The linking may be performed at block 704 by joining respective models corresponding to one or more common attributes (e.g., a user identify, a user persona, a use case topic, etc.). For example, the mapping may join all cloud migration topic models associated with the user to the cloud migration topic of the crowdsourced user. In another example, models of internal user medical device engineers may be joined to models of crowdsourced user medical device engineers. In yet another example, one or more models maybe mapped according to the data sets required to operate the respective models.

The method 700 may include scoring and ranking the ML models of the internal users and the ML models of the crowdsource users (block 706). The scoring and ranking may be performed as discussed herein. For example, the models may be ranked according to the efficiency of the respective models. The models may be ranked, or ordered, according to the respective efficiency score of each model. The method 700 may include generating an inventory of ranked ML models, including the templates and respective ranking of each ranked ML model (block 708). The generated inventory may be displayed in a computing device, so that the internal user and/or the crowdsource user can view, copy, edit and reevaluate each model, in some aspects. In some aspects, the method 700 may rank both use cases and users, e.g., according to how well the environment generated by the user meets the client's needs.

The method 700 may include proposing an optimized AI model using the generated scores and/or the ranking (block 710). For example, the method 700 may propose using an ML model that receives the highest score at the block 706. In some aspects, the ranking may be modified according to the user's preferences. For example, the user may choose to a multi-level ordering of the respective ML models first according to lowest cost, followed by lowest use of computational resources. The I/O module 146 may include instructions that allow the user to select one or more ML model efficiency attributes upon which to base the multi-level ordering (e.g., a number of checkboxes in a graphical user interface (not depicted)).

In some aspects, the method 700 may include a loop, wherein at block 706, the scored and ranked ML models of the internal users and the ML models of the crowdsource users are analyzed using AI industry technology insights, to compare the performance of the ML models and adjust the mapping, or add additional models for scoring and ranking (e.g., an ML model identified by scraping an Internet website) (block 712). In still further aspects, the method 700 may include receiving input user asset details from an MR enabled sandbox environment, as in block 504 of FIG. 5 (block 716). The input may cause an intelligence optimizer AI engine to be initialized, as in block 164 of FIG. 1B (block 718).

Figure 8:
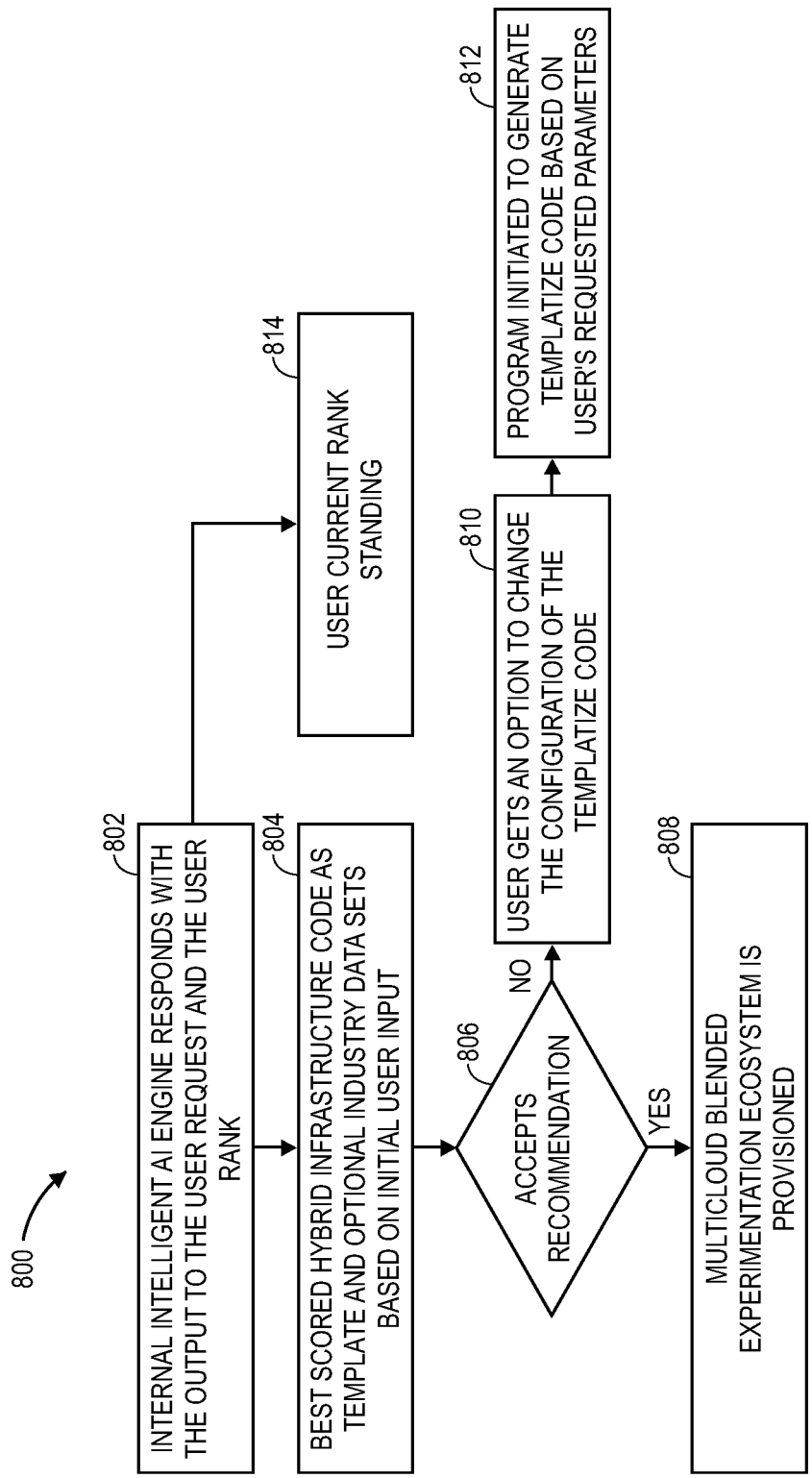
FIG. 8 is an exemplary block flow diagram depicting a computer-implemented method for executing one or more ML models, according to some aspects.

FIG. 8 is an exemplary block flow diagram depicting a computer-implemented method 800 for executing one or more ML models, according to some aspects. The method 800 may include receiving a user request to execute, or run, one or more ML models (e.g., one or more of the models discussed with respect to any of FIG. 1B-FIG. 7) (block 802). The method 800 may process the user's request by executing the model, optionally, using one or more input parameters specifying, for example, a stored set of neural network weights, one or more inference data sets, etc. (block 802). In this way the user may selectively and iteratively test multiple models using different initialization and inference parameters. The method 800 may include determining the best scored hybrid infrastructure code based on the user request (block 804). For example, the method 800 may execute a plurality of related models and score the efficiency of the models. The method 800 may recommend one of the models according to a ranking, as discussed herein. The user may accept the recommendation (block 806). When the user accepts the recommendation, the method 800 may generate an experimentation ecosystem including the recommended model (block 808). For example, the experimentation ecosystem may correspond to the environment 100 of FIG. 1A and may target, for example, a multi-cloud deployment, a virtual reality deployment, a mixed-reality deployment, etc.

In an aspect, the user may not accept the recommendation. In that case, the method 800 may display in a display device, to the user, an option to modify the configuration of the initialization and/or inference parameters (e.g., by receiving one or more selections of the user via an HTML form) including an option for changing the templates associated with the one or more ML models (block 810). The method 800 may then, in response to the user's selection, generate one or more ML models using the user's updated selections (block 812).

In some aspects, the method 800 may include receiving a user current rank, wherein the user is ranked against other users according to the performance of the user's ML models. For example, the one or more models may relate to cloud migrations. One of the models may be specific to migration from Amazon Web Services to Google Cloud platform. This migration may happen in multiple ways: e.g., via an API, via engineering skills, via a specific product, etc. These options may be input to the system as use cases and experimented with according to the discussion above. Each may be associated with a specific ML model that determines a respective efficiency score as discussed, and the scores of each technique may be ranked as discussed. Users may receive instant feedback as to the efficiency of each technique, and in the future, when additional use cases are added, the champion-challenger analysis may displace a current highest-ranked ML model(s) relating to one use case. This advantageously enables scoring based on how well the cloud migration happens (e.g., how fast the migration occurs, how many components are required for the migration, the lack of a weakest link of the migration, human feedback, etc.). This scoring enables competition between internal and open source modeling approaches. The scoring of models may be reflected in the user current rank. Specifically, when a user adds a new use case and/or ML model that is ranked, the method 800 may adjust the rank of the user using the ranked ML model. This approach advantageously enables competition for best-in-class use case outcomes from multiple sources, and reduces bias, basing user rankings on user skill. As discussed, the user's experiments may be continuously evaluated and the rankings of the modeling and the user updated.

Figure 9:
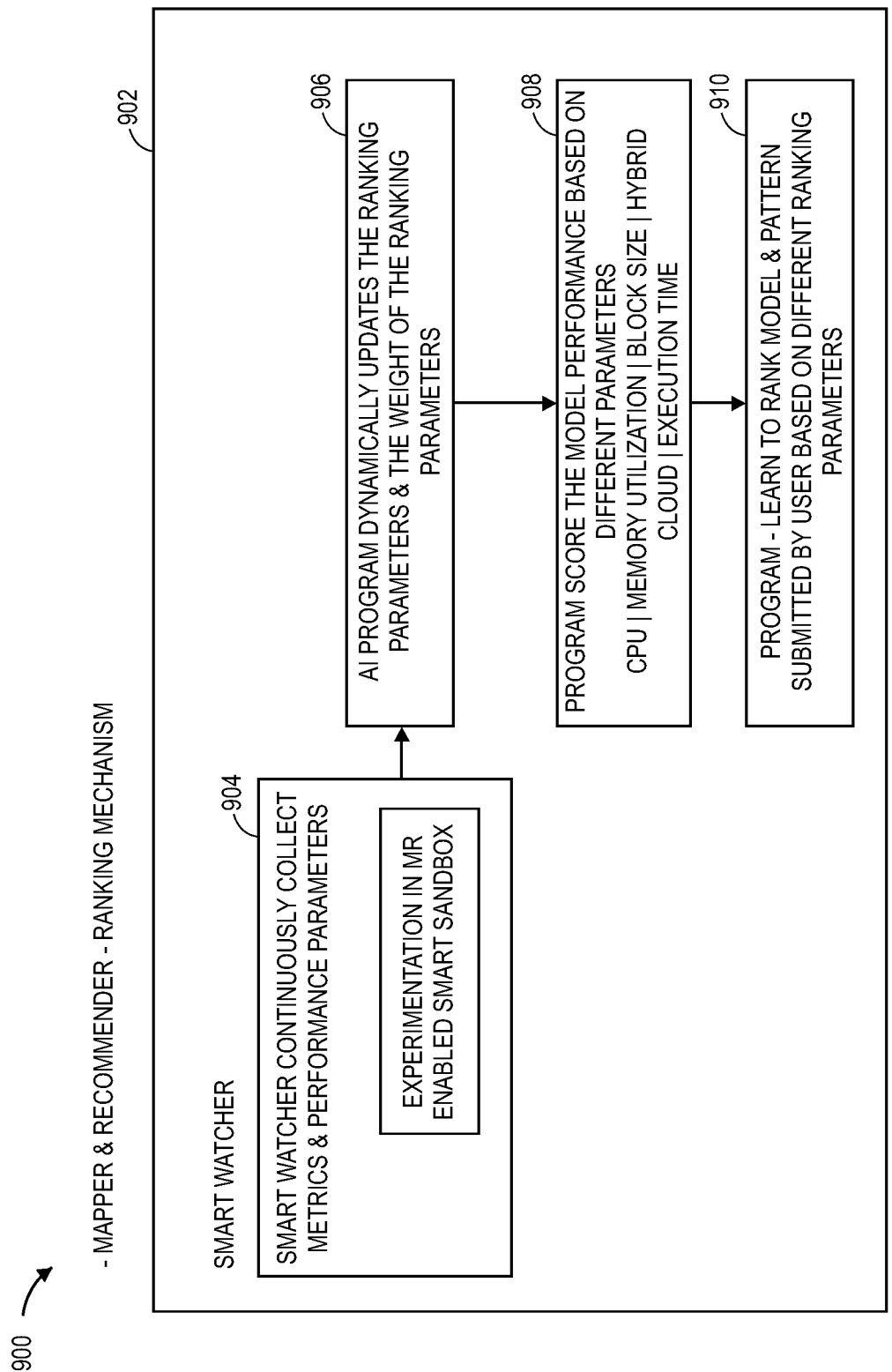
FIG. 9 is an exemplary block flow diagram depicting a computer-implemented method 900 for performing dynamic model mapping and ranking, according to some aspects.

FIG. 9 is an exemplary block flow diagram depicting a computer-implemented method 900 for performing dynamic model mapping and ranking, according to some aspects. The method 900 may include receiving, at a smart watcher module (block 902) a continuous stream of metrics and performance parameters including experiments performed in the MR enabled smart sandbox, in some aspects (block 904). For example, at block 304 of FIG. 3 and at block 504 of FIG. 3, as the respective crowdsource user and internal user experiment in the MR enabled sandbox, the user's interactions (e.g., via the I/O module 146 of FIG. 1) may the metrics and performance parameters to be received at the mapper at block 904. For example, each time the respective user updates an ML model comprising an experiment, and/or an efficiency metric of the model, the method 900 may dynamically update the ranking parameters and weight of the ranking parameters (block 906). The method 900 may include scoring the model performance based on ranking parameters (block 908). For example, one or more respective scores corresponding to performance (i.e., efficiency) parameters may be generated, such as CPU utilization, memory utilization, block size, hybrid cloud suitability, execution time (e.g., wall clock time or CPU cycles). The method 900 may perform further ranking of models and use cases submitted by the respective users based on the ranking parameters (block 910).

Figure 10:
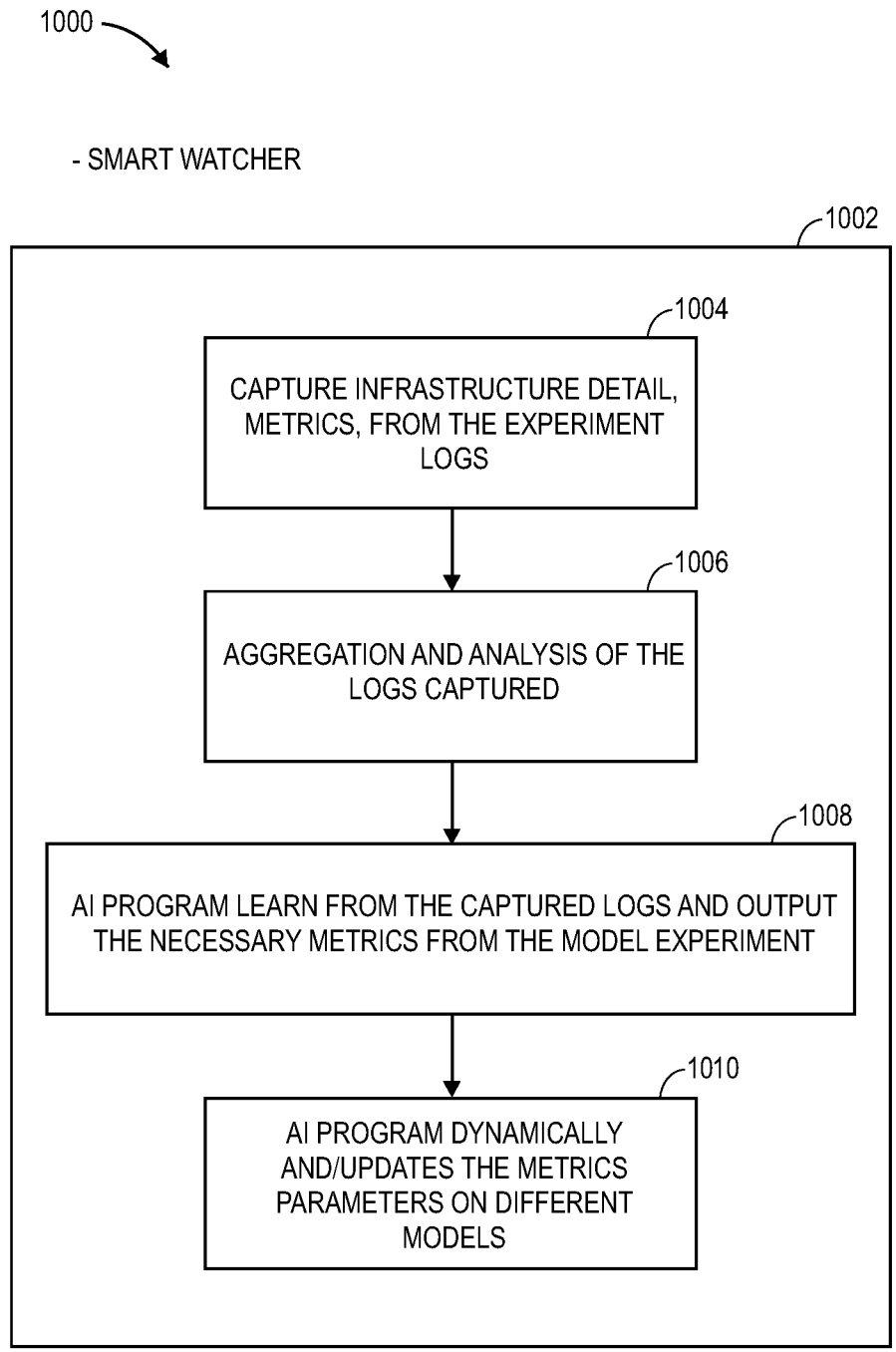
FIG. 10 is an exemplary block flow diagram depicting a computer-implemented method 1000 for analyzing log data in a smart watcher (block 1002), according to some aspects.

FIG. 10 is an exemplary block flow diagram depicting a computer-implemented method 1000 for analyzing log data in a smart watcher (block 1002), according to some aspects. The method 1000 may include capturing infrastructure detail, such as user metrics, log files, etc. while one or more users are accessing the environment 100 (block 1004). The method 1000 may include aggregating and/or analyzing the captured infrastructure detail (block 1006). The method 1000 may use a log analysis tool (e.g., Splunk) to perform the aggregation and/or analysis, in some aspects. The method 1000 may include analyzing the captured infrastructure detail using one or more ML models to generate metrics from model experiments (block 1008). The method 1000 may include dynamically updating parameters of metrics of the one or more ML models (block 1010). All actions in the environment 100 may be logged, in some aspects. The method 1000 may analyze use case building patterns, use case code building patterns, user experience, steps users go through to generate an experiment, etc.

Figure 11:
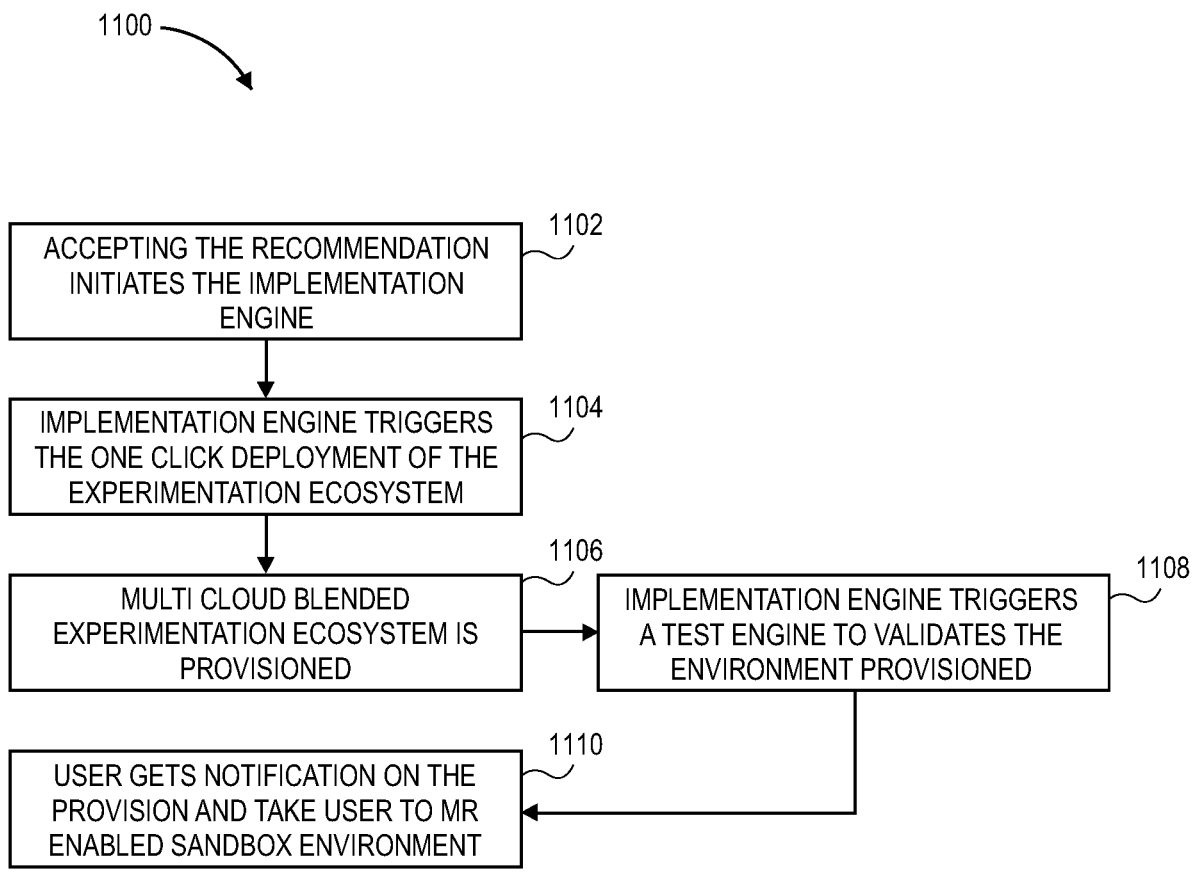
FIG. 11 is an exemplary block flow diagram depicting a computer-implemented method for deploying one or more ML models, according to some aspects.

FIG. 11 is an exemplary block flow diagram depicting a computer-implemented method 1100 for deploying one or more ML models, according to some aspects. The method 1100 may include initializing an implementation engine when a user accepts an ML model recommendation (block 1102). In some aspects, one or more of the blocks of the method 1100 may correspond to blocks discussed above, such as the block 806 of FIG. 8 and/or the block 168 of FIG. 1B. The method 1100 may include the initialized implementation engine triggering a one-click deployment of the experimentation ecosystem (block 1104). Specifically, at block 1104, the mapper-recommender module 152 and/or optimization module 154 of FIG. 1A may have already ranked a plurality of experimental ML models input by the user according to efficiency and/or other criteria.

Thus, once the user accepts the recommendation at block 1102, this is an indication to the method 1100 that the user is prepared for the one-click deployment to take place (e.g., when the user persona is a business user, or when the user specifically chooses a one-click deployment target). In this case, the method 1100 may further include automatic provisioning of a multi-cloud blended experimentation ecosystem. Specifically, the implementation module 156 may include a computer-executable set of instructions that, when executed, cause a computer (e.g., the servers 104) to analyze the one or more experimental ML models of the user, the related model templates and/or related data sets (i.e., the model dependencies) as discussed above. The implementation module 156 may include additional instructions that cause the computer to replicate the one or more experimental ML models and model dependencies in a computing environment (e.g., an automatically-deployed cloud computing instance).

In some aspects, the method 1100 may include triggering a test engine that validates the provisioned replicated environment, to ensure that the provisioned replicated environment corresponds, at least materially, to the experimental ecosystem (block 1108). The method 110 may include causing a notification to be generated and/or displayed in a computing device of the user (e.g., the client device 102 of FIG. 1) that directs the user to the replicated MR enabled sandbox environment (1110). Specifically, the notification may provide the user with an HTTP link (for a non-technical user), an SSH public key and IP address of the provisioned replicated environment (for an engineering user), or another suitable means of accessing the replicated environment.

Exemplary Use Cases

As stated, the present techniques solve conventional problems faced by consultancy companies. Following are several non-limiting examples of use cases that may be addressed by the present improved AI-based use case recommendation techniques, both in the managed services prototyping context and in other areas:

Cloud platform migrations—migration from one cloud provider (e.g., Amazon Web Services) to another (e.g., Microsoft Azure).

Reducing errors in a distribution center—Using the present techniques, a user may determine that a particular type of smart eyewear is better than another. For example, a managed services consultant may initially believe that Google Smart Glasses are a good device to reduce errors. With reference to FIG. 1B, this use case may be provided at block 162*a*. Based on internal user experiments and insights at block 170, at block 164, the mapper may map the Google smart glasses use case to other related use cases according to hardware and industry standardization (e.g., Oculus, etc.), application type (e.g., error reduction in distribution centers), etc. At block 164, the recommender may access a trained ML model that predicts that the optimized technology is Google glass. In an aspect, at block 162*b*, a crowd-source user may submit that another smart eye wear use case (Vuzix) is more appropriate. The user may then analyze each of the use cases using one or more trained ML models. One of the ML models may be a capabilities model that indicates that Vuzix is preferable, due to Google glass being monocular, whereas Vuzix is dual-eyed. The model may predict that Vuzix is optimized due to factors such as fatigue, disability, stress, etc. For example, the model may predict an error reduction rate using Google glass of 97% and 99.7% with Vuzix. The user may confirm the predictions of the model by deploying the use cases into an ecosystem that enables the user to view the use case options in multiple dimensions. This example illustrates again that the present techniques result in much faster time-to-market.

Creating a virtual environment capable to generate data based on observable trial and error—Clients rely on consultants to develop solutions for their businesses. Many times, these solutions lack data. While our innovation can generate synthetic data, such data may not be accepted as a solution due to legal or other requirements. In these situations, real data is needed. In this case, 3D artifacts aspects of the present invention (e.g., AR, VR, MR, etc.) can generate functionally identical physical 3D artifacts that can be used within a deployed virtual laboratory by technical and non-technical users, to observe events and collect valuable data and insights. For example, the speed flow of a fluid of various viscosity through a pipe of various sizes, the process of building of several complex components and the ability to ensemble them at different temperatures as the materials expand and contract, simulation of 3D printing, etc.

Gathering model training data when none is available or the available is insufficient—client data used by internal consultancy may include only a limited number of images (e.g., used to train models to detect lung cancer through computed tomography) and no industry data is available. Crowd sourcing may help to enhance existing models to get better results (e.g., for detection with more data related to lung cancer CTs and models for analysis).

Creating services for clinical trials—client data/consultant data may be limited to a particular customer and other inventions are not well known. Industry trends include a few vague predictions. The present techniques may be used so solicit ideas from crowd source/medical communities to contribute information (e.g., articles regarding blockchain techniques) to make clinical trials more robust and the same experiments and to avoid repetition over and over by different people Detecting problems in utility lines and take proactive action—an electric power or water pipeline may break down due to weather conditions, accident, forest fires, etc. The present techniques may be used to crowd source data about the break down, e.g., a time, a location, etc. This information may be viewed in real time/mixed reality to assess the situation correctly and arrange for services to be provided. In some cases, of proactive services may be initiated, e.g., if an unscheduled event/rain occurs and is captured by the system.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "an one aspect" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for receiving and processing use case information, comprising: receiving, via an electronic network, a plurality of user use case experiments; analyzing, via one or more processors, the use case experiments using an artificial intelligence engine to order each of the plurality of use case experiments; generating, via one or more processors, one or more optimized machine learning models based on the ordered experiments; and causing, via one or more processors, one or more optimized deployment options to be displayed in a client computing device.

2. The computer-implemented method of aspect 1, wherein the use case experiments include one or both of i) an internal use case; and ii) a crowdsourced use case; and wherein the user is one or both of i) an internal user, and ii) a crowdsource user.

3. The computer-implemented method of aspect 1, wherein analyzing, via the one or more processors, the use case experiments using the artificial intelligence engine to order each of the one or more use case experiments includes analyzing the plurality of user use case experiments using a champion-challenger algorithm.

4. The computer-implemented method of aspect 1, wherein analyzing, via the one or more processors, the use case experiments using the artificial intelligence engine to order each of the one or more use case experiments includes scoring each respective use case based on predicted efficiency using a trained machine learning model.

5. The computer-implemented method of aspect 1, wherein generating, via one or more processors, the one or more optimized machine learning models based on the ordered experiments includes: matching a set of similar industry insights based on keyword similarity using an unsupervised machine learning model; and classifying the set of similar industry insights based on identifying one or more assets included in the set of similar industry insights.

6. The computer-implemented method of aspect 1, further comprising: generating, via one or more processors, in response to receiving a user selection of at least one of the one or more optimized deployment options, a replicated experimentation ecosystem corresponding to at least one of the ordered use case experiments.

7. The computer-implemented method of any of aspects 1-6, wherein the replicated experimentation ecosystem is deployed as at least one of i) a multi-cloud deployment; ii) a hybrid cloud deployment; iii) an on-premises deployment; iv) a bare metal deployment; v) a virtual reality deployment; vi) a mixed-reality deployment; or vii) an augmented reality deployment.

8. A computing system for generating cloud deployments by identifying optimized use cases, comprising: one or more processors; and a memory comprising instructions, that when executed, cause the computing system to: receive, via an electronic network, a plurality of user use case experiments; analyze, via one or more processors, the plurality of user use case experiments using an artificial intelligence engine to order each of the plurality of use case experiments; generate, via one or more processors, one or more optimized machine learning models based on the ordered experiments; and cause, via one or more processors, one or more optimized deployment options to be displayed in a client computing device.

9. The computing system of aspect 8, the memory comprising further instructions that, when executed, cause the system to: analyze one or both of i) an internal use case; and ii) a crowdsourced use case.

10. The computing system of aspect 8, the memory comprising further instructions that, when executed, cause the system to: analyze the plurality of user use case experiments using a champion-challenger algorithm.

11. The computing system of aspect 8, the memory comprising further instructions that, when executed, cause the system to: score each respective use case based on predicted efficiency using a trained machine learning model.

12. The computing system of aspect 8, the memory comprising further instructions that, when executed, cause the system to: match a set of similar industry insights based on keyword similarity using an unsupervised machine learning model; and classify the set of similar insights based on identifying one or more assets included in the similar industry insights.

13. The computing system of aspect 8, the memory comprising further instructions that, when executed, cause the system to: generate, via one or more processors, in response to receiving a user selection of at least one of the one or more optimized deployment options, a replicated experimentation ecosystem corresponding to at least one of the ordered use case experiments.

14. The computing system of aspect 8, the memory comprising further instructions that, when executed, cause the system to: continuously and dynamically update the order of each of the one or more use case experiments based on at least one of i) a performance metric or ii) a performance parameter.

15. A non-transitory computer-readable storage medium storing executable instructions that, when executed by a processor, cause a computer to: receive, via an electronic network, a plurality of user use case experiments; analyze, via one or more processors, the use case information using an artificial intelligence engine to order each of the one or more use case experiments; generate, via one or more processors, one or more optimized machine learning models based on the ordered experiments; and cause, via one or more processors, one or more optimized deployment options to be displayed in a client computing device.

16. The non-transitory computer-readable storage medium of aspect 15, storing further executable instructions that, when executed, cause a computer to: analyze one or both of i) an internal use case; and ii) a crowdsourced use case.

17. The non-transitory computer-readable storage medium of aspect 15, storing further executable instructions that, when executed, cause a computer to: analyze the plurality of user use case experiments using a champion-challenger algorithm.

18. The non-transitory computer-readable storage medium of aspect 15, storing further executable instructions that, when executed, cause a computer to: score each respective use case based on predicted efficiency using a trained machine learning model 19. The non-transitory computer-readable storage medium of aspect 15, storing further executable instructions that, when executed, cause a computer to: match a set of similar industry insights based on keyword similarity using an unsupervised machine learning model; and classify the set of similar insights based on identifying one or more assets included in the similar industry insights.

20. The non-transitory computer-readable storage medium of aspect 15, storing further executable instructions that, when executed, cause a computer to: continuously and dynamically update the order of each of the one or more use case experiments based on at least one of i) a performance metric or ii) a performance parameter.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for receiving and processing use case information, comprising:
   receiving, via an electronic network, a plurality of user use case experiments;
   analyzing, via one or more processors, the use case experiments using an artificial intelligence engine to order each of the plurality of use case experiments, wherein the analyzing includes scoring each of the use case experiments using a mapper-recommender module to predict a respective efficiency of each use case for performing a supervised or unsupervised machine learning technique;
   generating, via one or more processors, one or more optimized machine learning models based on the ordered user use case experiments; and
   causing, via one or more processors, one or more optimized deployment options to be displayed in a client computing device, each including at least one respective computing resource and at least one respective target platform.

2. The computer-implemented method of claim 1,
   wherein the use case experiments include one or both of i) an internal use case; and ii) a crowdsourced use case; and
   wherein the user is one or both of i) an internal user, and ii) a crowdsource user.

3. The computer-implemented method of claim 1,
   wherein analyzing, via the one or more processors, the use case experiments using the artificial intelligence engine to order each of the one or more use case experiments includes analyzing the plurality of user use case experiments using a champion-challenger algorithm.

4. The computer-implemented method of claim 1,
wherein analyzing, via the one or more processors, the use case experiments using the artificial intelligence engine to order each of the one or more use case experiments includes scoring each respective use case based on predicted efficiency using a trained machine learning model.

5. The computer-implemented method of claim 1,
wherein generating, via one or more processors, the one or more optimized machine learning models based on the ordered experiments includes:
matching a set of similar industry insights based on keyword similarity using an unsupervised machine learning model; and
classifying the set of similar industry insights based on identifying one or more assets included in the set of similar industry insights.

6. The computer-implemented method of claim 1, further comprising:
generating, via one or more processors, in response to receiving a user selection of at least one of the one or more optimized deployment options, a replicated experimentation ecosystem corresponding to at least one of the ordered use case experiments.

7. The computer-implemented method of claim 6, wherein the replicated experimentation ecosystem is deployed as at least one of i) a multi-cloud deployment; ii) a hybrid cloud deployment; iii) an on-premises deployment; iv) a bare metal deployment; v) a virtual reality deployment; vi) a mixed-reality deployment; or vii) an augmented reality deployment.

8. A computing system for generating cloud deployments by identifying optimized use cases, comprising:
one or more processors; and
a memory comprising instructions, that when executed, cause the computing system to:
receive, via an electronic network, a plurality of user use case experiments;
analyze, via one or more processors, the plurality of user use case experiments using an artificial intelligence engine to order each of the plurality of use case experiments, wherein the analyzing includes scoring each of the use case experiments using a mapper-recommender module to predict a respective efficiency of each use case for performing a supervised or unsupervised machine learning technique;
generate, via one or more processors, one or more optimized machine learning models based on the ordered user use case experiments; and
cause, via one or more processors, one or more optimized deployment options to be displayed in a client computing device, each including at least one respective computing resource and at least one respective target platform.

9. The computing system of claim 8, the memory comprising further instructions that, when executed, cause the system to:
analyze one or both of i) an internal use case; and ii) a crowdsourced use case.

10. The computing system of claim 8, the memory comprising further instructions that, when executed, cause the system to:
analyze the plurality of user use case experiments using a champion-challenger algorithm.

11. The computing system of claim 8, the memory comprising further instructions that, when executed, cause the system to:
score each respective use case based on predicted efficiency using a trained machine learning model.

12. The computing system of claim 8, the memory comprising further instructions that, when executed, cause the system to:
match a set of similar industry insights based on keyword similarity using an unsupervised machine learning model; and
classify the set of similar insights based on identifying one or more assets included in the similar industry insights.

13. The computing system of claim 8, the memory comprising further instructions that, when executed, cause the system to:
generate, via one or more processors, in response to receiving a user selection of at least one of the one or more optimized deployment options, a replicated experimentation ecosystem corresponding to at least one of the ordered use case experiments.

14. The computing system of claim 8, the memory comprising further instructions that, when executed, cause the system to:
continuously and dynamically update the order of each of the one or more use case experiments based on at least one of i) a performance metric or ii) a performance parameter.

15. A non-transitory computer-readable storage medium storing executable instructions that, when executed by a processor, cause a computer to:
receive, via an electronic network, a plurality of user use case experiments;
analyze, via one or more processors, the use case information using an artificial intelligence engine to order each of the one or more use case experiments, wherein the analyzing includes scoring each of the use case experiments using a mapper-recommender module to predict a respective efficiency of each use case for Performing a supervised or unsupervised machine learning technique;
generate, via one or more processors, one or more optimized machine learning models based on the ordered user use case experiments; and
cause, via one or more processors, one or more optimized deployment options to be displayed in a client computing device, each including at least one respective computing resource and at least one respective target platform.

16. The non-transitory computer-readable storage medium of claim 15, storing further executable instructions that, when executed, cause a computer to:
analyze one or both of i) an internal use case; and ii) a crowdsourced use case.

17. The non-transitory computer-readable storage medium of claim 15, storing further executable instructions that, when executed, cause a computer to:
analyze the plurality of user use case experiments using a champion-challenger algorithm.

18. The non-transitory computer-readable storage medium of claim 15, storing further executable instructions that, when executed, cause a computer to:
score each respective use case based on predicted efficiency using a trained machine learning model.

19. The non-transitory computer-readable storage medium of claim 15, storing further executable instructions that, when executed, cause a computer to:

match a set of similar industry insights based on keyword similarity using an unsupervised machine learning model; and classify the set of similar insights based on identifying one or more assets included in the similar industry insights.

20. The non-transitory computer-readable storage medium of claim 15, storing further executable instructions that, when executed, cause a computer to:

continuously and dynamically update the order of each of the one or more use case experiments based on at least one of i) a performance metric or ii) a performance parameter.

\* \* \* \* \*